United States Patent
Nihei

(10) Patent No.: US 9,781,734 B2
(45) Date of Patent: Oct. 3, 2017

(54) COMMUNICATION APPARATUS, COMMUNICATION METHOD, AND RECORDING MEDIUM

(71) Applicant: NEC Corporation, Minato-ku, Tokyo (JP)

(72) Inventor: Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/100,696

(22) PCT Filed: Dec. 24, 2014

(86) PCT No.: PCT/JP2014/006429
§ 371 (c)(1),
(2) Date: Jun. 1, 2016

(87) PCT Pub. No.: WO2015/098102
PCT Pub. Date: Jul. 2, 2015

(65) Prior Publication Data
US 2016/0302219 A1    Oct. 13, 2016

(30) Foreign Application Priority Data
Dec. 26, 2013  (JP) .................................. 2013-268572

(51) Int. Cl.
*H04W 72/00*  (2009.01)
*H04W 72/12*  (2009.01)

(52) U.S. Cl.
CPC .............................. *H04W 72/1205* (2013.01)

(58) Field of Classification Search
CPC ..... H04W 72/04; H04W 76/02; H04W 16/10; H04W 16/14; H04W 28/16
(Continued)

(56) References Cited

U.S. PATENT DOCUMENTS

2010/0322205 A1   12/2010   Hole et al.
2013/0028223 A1    1/2013   Kim et al.
(Continued)

FOREIGN PATENT DOCUMENTS

JP    2008-160377 A    7/2008
JP    2010-041324 A    2/2010
(Continued)

OTHER PUBLICATIONS

International Search Report for PCT Application No. PCT/JP2014/006429, mailed on Mar. 10, 2015.
(Continued)

*Primary Examiner* — Temica M Beamer

(57) ABSTRACT

Disclosed is a communication apparatus or the like that is capable of reliably reducing communication delay. A communication apparatus (1101) has a transmission unit (1102), which, in a first period, transmits trigger information via a communication network (1103) corresponding to communication resource allocation, then, transmits information using the allocated communication resource, said first period being from first timing at which information is transmitted via the communication network (1103) to a second timing at which a specific communication resource is allocated to a request for communication resources for transmitting the information.

10 Claims, 21 Drawing Sheets

(58) Field of Classification Search
USPC .............................................. 455/450, 452.1
See application file for complete search history.

(56) References Cited

U.S. PATENT DOCUMENTS

| | | | |
|---|---|---|---|
| 2016/0088487 A1* | 3/2016 | Yu ......................... | H04W 16/14 370/329 |
| 2016/0100441 A1* | 4/2016 | Li .......................... | H04L 67/16 370/329 |
| 2016/0278047 A1* | 9/2016 | Hoshino ............... | H04W 24/10 |

FOREIGN PATENT DOCUMENTS

| | | |
|---|---|---|
| JP | 2011-135207 | 7/2011 |
| WO | 2015/012077 A1 | 1/2015 |

OTHER PUBLICATIONS

English translation of Written opinion for PCT Application No. PCT/JP2014/006429.

* cited by examiner

COMMUNICATION APPARATUS, COMMUNICATION METHOD, AND RECORDING MEDIUM

This application is a National Stage Entry of PCT/JP2014/006429 filed on Dec. 24, 2014, which claims priority from Japanese Patent Application 2013-268572 filed on Dec. 26, 2013, the contents of all of which are incorporated herein by reference, in their entirety.

TECHNICAL FIELD

The present invention relates to, for example, a communication apparatus and the like capable of managing communication resources.

BACKGROUND ART

In a wireless communication network based on LTE (Long_Term_Evolution), a base station (eNodeB) controls communication resources regarding the communication network.

When information is transmitted from a base station to a terminal (i.e. in "downstream communication"), the base station allocates communication resources that transmit information to the terminal to the downstream communication in accordance with reception of the information from an apparatus such as a Serving_Gateway (S-GW) and a Mobility_Management_Entity (MME). In this case, the base station immediately allocates the communication resources to the downstream communication. Therefore, in the downstream communication, a communication delay hardly occurs.

Next, processing in which information is transmitted from a terminal to a base station (i.e. in "upstream communication") will be described with reference to FIG. 22. FIG. 22 is a sequence diagram illustrating processing in which information is transmitted from a terminal to a base station.

In the upstream communication, the terminal waits for the base station's allocation of second communication resources that transmits a control message (e.g. PUCCH, Physical_Uplink_Control_Channel, hereinafter, expressed as a "first message") requesting first communication resources that transmit information (first information in FIG. 22) to the base station. The base station allocates the second communication resources regarding the first message to the terminal at a second timing. An interval of the second timing is substantially constant in many cases.

The terminal transmits the first message to the base station using the second communication resources in accordance with allocation of the second communication resources by the base station.

The base station receives the first message and allocates first communication resources to the upstream communication in accordance with the received first message. Thereafter, the base station transmits a control message (e.g. PDCCH, Physical_Downlink_Control_Channel, hereinafter, expressed as a "second message") regarding the first communication resources to the terminal.

The terminal transmits information using the first communication resources in accordance with reception of the second message.

As described above, it is difficult for the terminal to transmit information in a period until the second communication resources are managed. Therefore, in the communication network, a communication delay occurs.

The base station continuously allocates, to the terminal, communication resources that continuously transmit information in a certain period after the terminal starts transmitting information. In this case, since the communication resources have been allocated to the terminal, the terminal does not need to newly be allocated a communication resource. Therefore, it is possible to transmit information (second information in FIG. 22) without a communication delay.

PTL 1 to PTL 3 disclose techniques for reducing a communication delay.

PTL 1 discloses a service control apparatus having a real time property. First, the service control apparatus receives a message for previously announcing that an application program or the like transmits information to a terminal. Then, the service control apparatus transmits dummy information for managing a communication path that transmits the information in a period from reception of the message to transmission of the information to the terminal by the application program or the like. As a result, a base station manages a communication path that transmits the information in accordance with transmission of the dummy information by the service control apparatus.

The base station manages the communication path in accordance with the dummy information, and therefore, it is possible for the application program or the like to transmit the information without newly managing a communication path. As a result, when the information is transmitted, a communication delay caused by managing a communication path is small.

PTL 2 discloses a band securing apparatus capable of avoiding congestion caused when information is transmitted via a communication network. The band securing apparatus transmits dummy information to a first apparatus in a period (hereinafter, expressed as a "preparation period") from detection of a request for transmitting data by the first apparatus to transmission of the data by the first apparatus, in the same manner as the service control apparatus disclosed by PTL 1.

PTL 3 discloses a stream distribution apparatus that estimates a congestion state in a communication network. The stream distribution apparatus estimates a magnitude of a transmission rate and a magnitude of a throughput in a communication network on the basis of a period required from transmission of a probe packet to reception of the probe packet.

CITATION LIST

Patent Literature

PTL 1: Japanese Laid-open Patent Publication No. 2010-41324

PTL 2: Japanese Laid-open Patent Publication No. 2008-160377

PTL 3: Japanese Laid-open Patent Publication No. 2011-135207

SUMMARY OF INVENTION

Technical Problem

Upon complying with LTE that is a communication standard for cellular phones, even when in a communication network, a communication path is managed, it is difficult for an application program or the like to transmit information until communication resources that realize the communication path is allocated. In this case, the application program or the like needs to wait for allocation of the communication resources when transmitting the information. In other words, in the communication network, a communication delay resulting from the communication resources occur.

The service control apparatus disclosed by PTL 1 does not manage communication resources while managing a communication path. Therefore, according to the service control apparatus, since it is impossible for an application program or the like to transmit information, a communication delay occurs when the information is transmitted.

The band securing apparatus disclosed by PTL 2 continues to transmit dummy information in a preparation period, and therefore redundantly transmits the dummy information to a first apparatus. Processing of redundantly transmitting dummy information becomes a cause for occurrence of a communication delay.

It is difficult for the stream distribution apparatus disclosed by PTL 3 to estimate a communication delay resulting from communication resources while estimating a congestion state. In other words, it is difficult for the stream distribution apparatus to solve the above-described communication delay.

Therefore, a main object of the present invention is to provide a communication apparatus or the like that reliably reduces a communication delay.

Solution to Problem

In order to achieve the object mentioned above, as an aspect of the present invention, a communication apparatus includes comprising:

transmission means for transmitting trigger information via a communication network and subsequently transmitting the information by using communication resources in accordance with allocation of communication resources during a first period, the first period being a period from a first timing of transmitting the information via the communication network to a second timing of allocating specific communication resources to a request requesting communication resources for transmitting the information.

Also, as another aspect of the present invention, a communication method comprising: by an information processing apparatus, transmitting trigger information via a communication network and subsequently transmitting the information by using communication resources in accordance with allocation of communication resources during a first period, the first period being a period from a first timing of transmitting the information via the communication network to a second timing of allocating specific communication resources to a request requesting communication resources for transmitting the information.

Furthermore, the object is also realized by a communication program, and a computer-readable recording medium which records the communication program.

Advantageous Effects of Invention

According to the communication apparatus or the like of the present invention, it is possible to reliably reduce a communication delay.

DESCRIPTION OF EMBODIMENTS

Next, exemplary embodiments carrying out the present invention will be described in detail with reference to the drawings.

First Exemplary Embodiment

Figure 1:
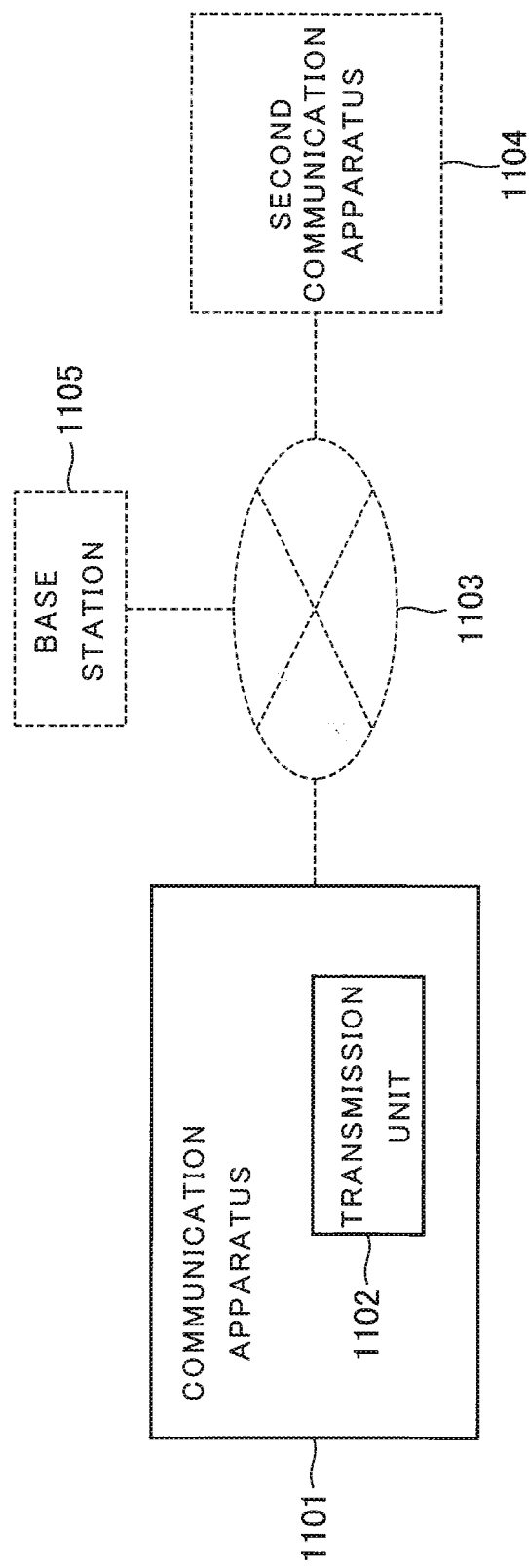
FIG. 1 is a block diagram illustrating the configuration of the communication apparatus according to the first exemplary embodiment of the present invention.
Figure 2:
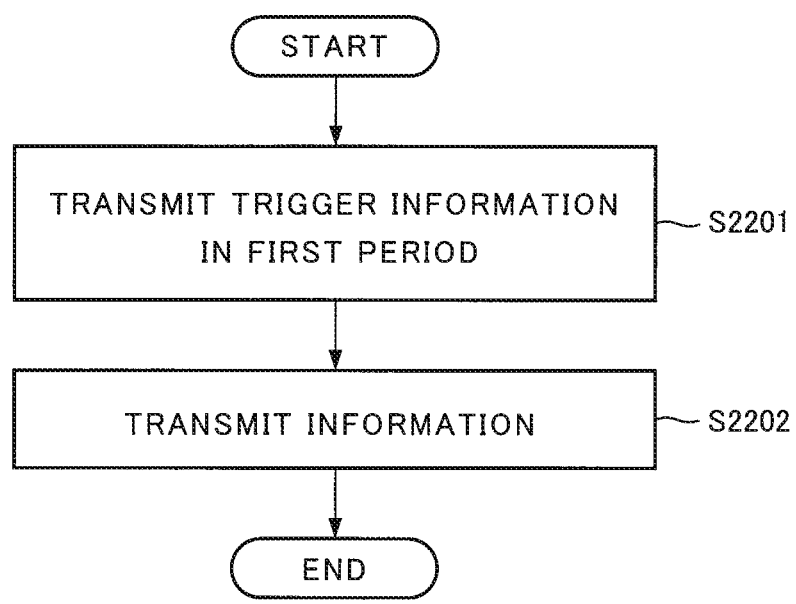
FIG. 2 is a flowchart illustrating a flow of processing in the communication apparatus according to the first exemplary embodiment.

A configuration of a communication apparatus 1101 according to a first exemplary embodiment of the present invention and processing executed by the communication apparatus 1101 will be described in detail with reference to FIG. 1 and FIG. 2. FIG. 1 is a block diagram illustrating the configuration of the communication apparatus 1101 according to the first exemplary embodiment of the present invention. FIG. 2 is a flowchart illustrating a flow of processing in the communication apparatus 1101 according to the first exemplary embodiment.

The communication apparatus 1101 according to the first exemplary embodiment includes a transmission unit 1102.

The communication apparatus 1101 can execute transmission/reception of information to/from a second communication apparatus 1104 via a communication network 1103.

For convenience of description, a period being a time period from a first timing of transmitting information to the second communication apparatus 1104 via the communication network 1103 to a second timing of allocating second communication resources to a request requesting communication resources for transmitting the information is expressed as a "first period." In the following description, the second communication resources may be expressed as "specific communication resources." The transmission unit 1102 transmits trigger information via the communication network in accordance with allocation of communication resources in the first period (step S2201).

The trigger information needs to be different from information transmitted by the transmission unit 1102 and may be the above-described dummy information.

The communication apparatus 1101 may read a first timing, for example, by referring to an application program or the like that transmits information. Alternatively, the communication apparatus 1101 may receive a first timing from the application program.

Further, the communication apparatus 1101 previously may read a second timing from a base station 1105. Further, the communication apparatus 1101 may estimate a second timing, as described later, on the basis of a timing of transmitting a packet, a timing of receiving a packet responding to the packet, or the like. The communication apparatus 1101 may store the second timing on a storage unit (not illustrated).

Then, the transmission unit 1102 transmits information to the second communication apparatus 1104 using the allocated communication resources (step S2202).

The communication apparatus 1101 transmits trigger information to the second communication apparatus 1104 in accordance with allocation of the communication resources in the first period, and thereby the base station 1105 continues to allocate the communication resources to the communication apparatus 1101.

Therefore, it is unnecessary for the communication apparatus 1101 to be allocated new communication resources when transmitting information. As a result, according to the communication apparatus 1101 of the present exemplary embodiment, a communication delay is reduced.

Further, the communication apparatus 1101 transmits trigger information in accordance with allocation of communication resources, and therefore, does not transmit useless trigger information.

On the other hand, in the techniques disclosed by PTL 1 and PTL 2, trigger information is transmitted independently of a second timing, and therefore, the trigger information may cause a communication delay in the communication network 1103.

In other words, according to the communication apparatus 1101 of the first exemplary embodiment, a communication delay can be reliably reduced.

An aspect in which the base station 1105 newly allocates communication resources in accordance with reception of a first message representing that information will be transmitted, may be employed.

In the above description, it is assumed that the base station 1105 allocated communication resources and second communication resources, but the second communication resources and the communication resources may be the same communication resources. The same applies for the exemplary embodiments of the present invention.

Second Exemplary Embodiment

Next, a second exemplary embodiment of the present invention based on the first exemplary embodiment will be described.

In the following description, characteristic portions according to the present exemplary embodiment will be mainly described, and the same configuration as in the first exemplary embodiment will be assigned with the same reference number to omit overlapping description.

Figure 3:
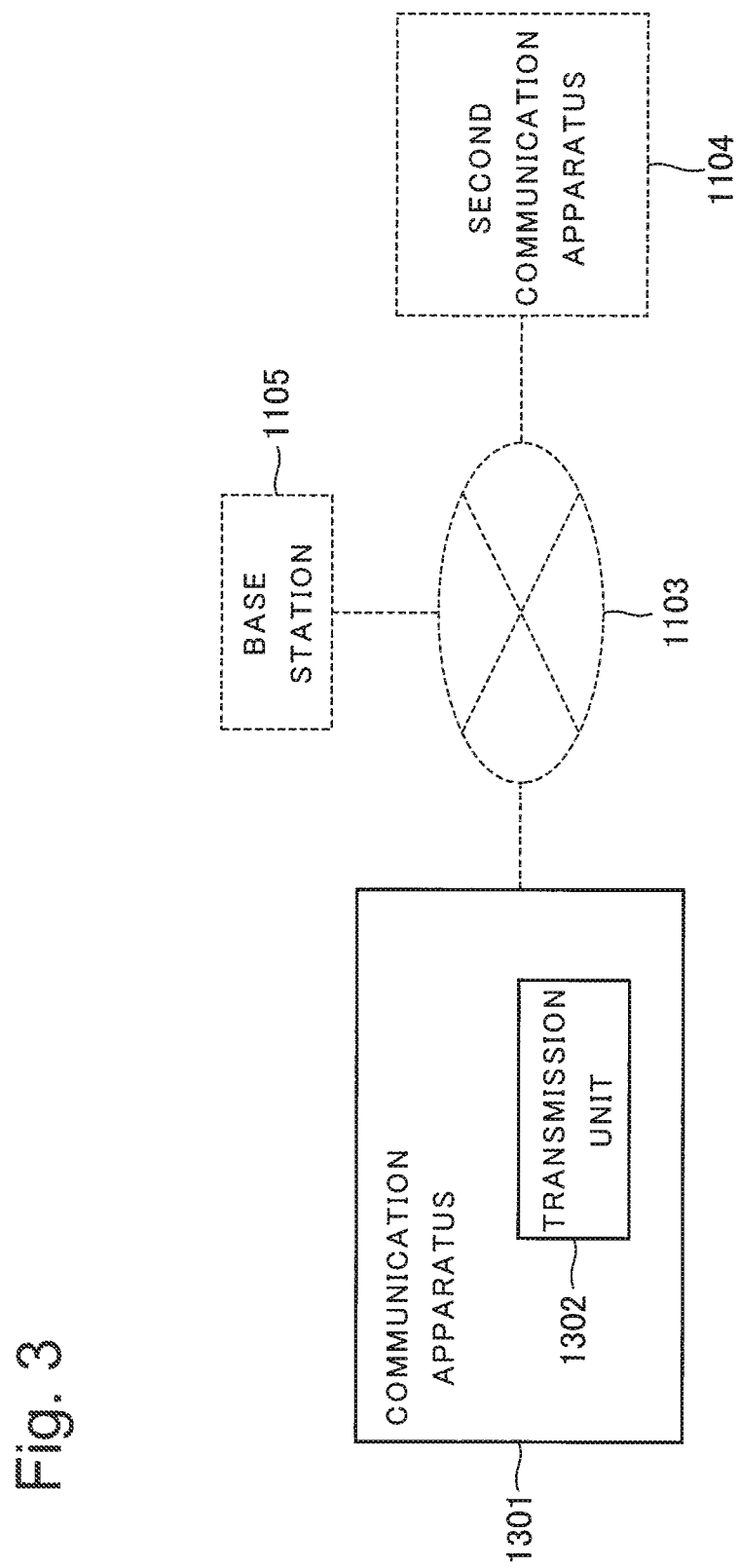
FIG. 3 is a block diagram illustrating the configuration of the communication apparatus according to the second exemplary embodiment of the present invention.
Figure 4:
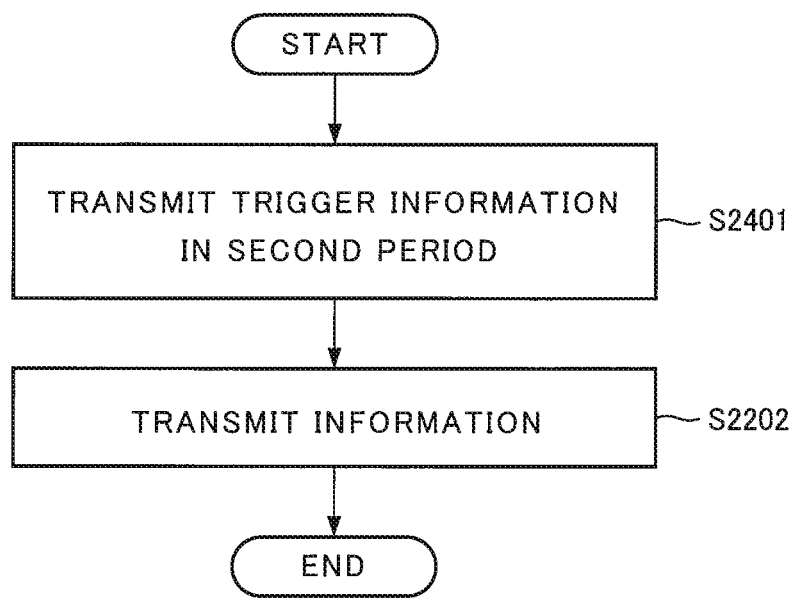
FIG. 4 is a flowchart illustrating a flow of processing in the communication apparatus according to the second exemplary embodiment.

With reference to FIG. 3 and FIG. 4, a configuration of a communication apparatus 1301 according to the second exemplary embodiment and processing executed by the communication apparatus will be described. FIG. 3 is a block diagram illustrating the configuration of the communication apparatus 1301 according to the second exemplary embodiment of the present invention. FIG. 4 is a flowchart illustrating a flow of processing in the communication apparatus 1301 according to the second exemplary embodiment.

The communication apparatus 1301 according to the second exemplary embodiment includes a transmission unit 1302.

The communication apparatus 1301 can execute transmission/reception of information to/from the second communication apparatus 1104 via the communication network 1103.

The transmission unit 1302 transmits trigger information via the communication network 1103 in a second period in which communication resources or second communication resources are allocated (step S2401).

When, for example, the transmission unit 1302 transmits trigger information at a latest timing in the second period, a number of times of transmission of the trigger information can be reduced. As a result, according to the communication apparatus 1301 of the present exemplary embodiment, a communication delay is further reduced.

When a first period being a period from a second timing to a first timing includes a plurality of second periods, the transmission unit 1302 may transmit trigger information every the second periods.

In this case, even when the first period is a long period, the base station 1105 continues to allocate communication resources to the communication apparatus 1301. Therefore, according to the communication apparatus 1301 of the present exemplary embodiment, a communication delay can be reliably reduced.

Further, when the transmission unit 1302 transmits trigger information at a latest timing in each second period, a number of times of transmission of the trigger information can be reduced. As a result, according to the communication apparatus 1301 of the present exemplary embodiment, a communication delay is further reduced.

Further, the transmission unit 1302 may transmit trigger information before a first timing and after a second timing closest to the first timing.

Then, the transmission unit 1302 transmits information to the second communication apparatus 1104 using communication resources (step S2202).

In this case, the first period becomes shortest, and therefore, according to the communication apparatus 1301 of the present exemplary embodiment, a communication delay is further reduced.

The communication apparatus 1301 according to the second exemplary embodiment includes a configuration similar to the first exemplary embodiment, and therefore, the second exemplary embodiment can have the advantageous effect similar to the first exemplary embodiment. In other words, according to the communication apparatus 1301 of the second exemplary embodiment, a communication delay can be reliably reduced.

Third Exemplary Embodiment

Next, a third exemplary embodiment of the present invention based on the above-described first exemplary embodiment will be described.

In the following description, characteristic portions according to the present exemplary embodiment will be mainly described, and the same configuration as in the first exemplary embodiment will be assigned with the same reference number to omit overlapping description.

Figure 5:
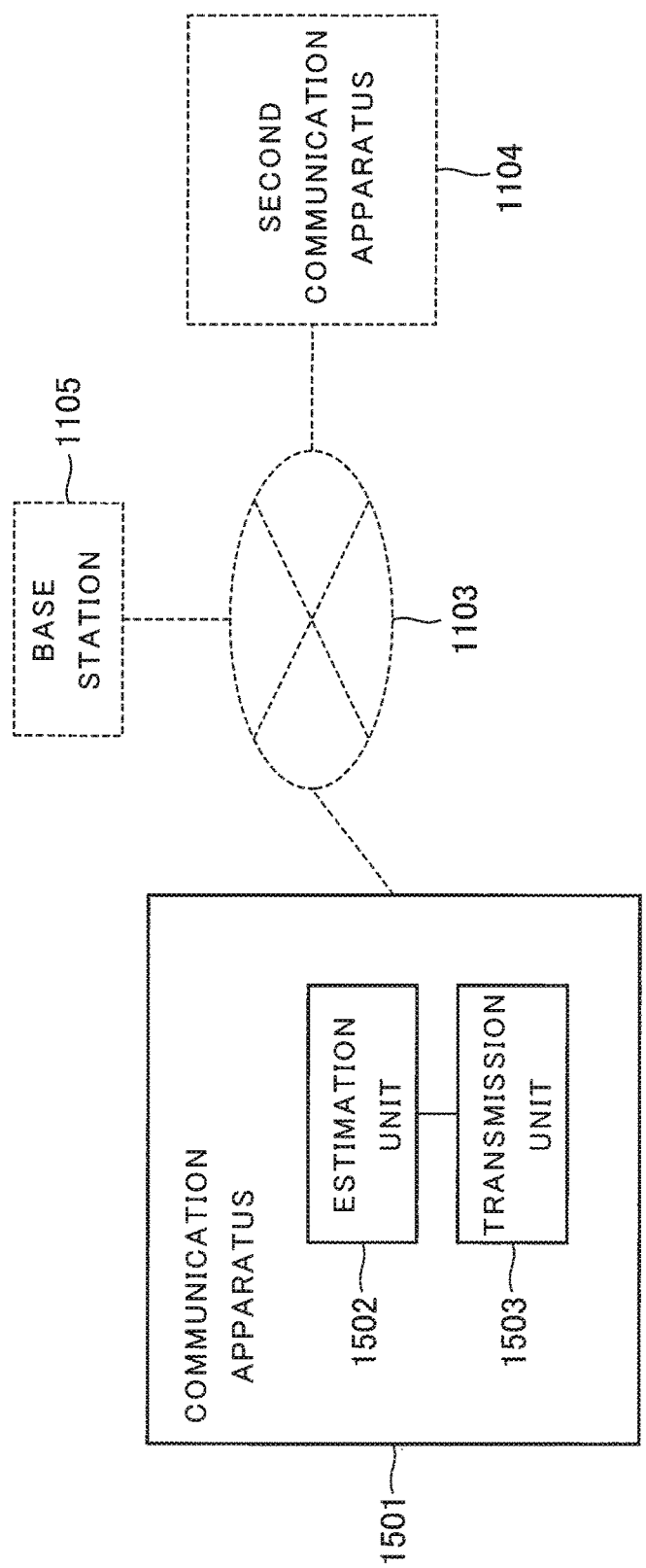
FIG. 5 is a block diagram illustrating the configuration of the communication apparatus according to the third exemplary embodiment of the present invention.
Figure 6:
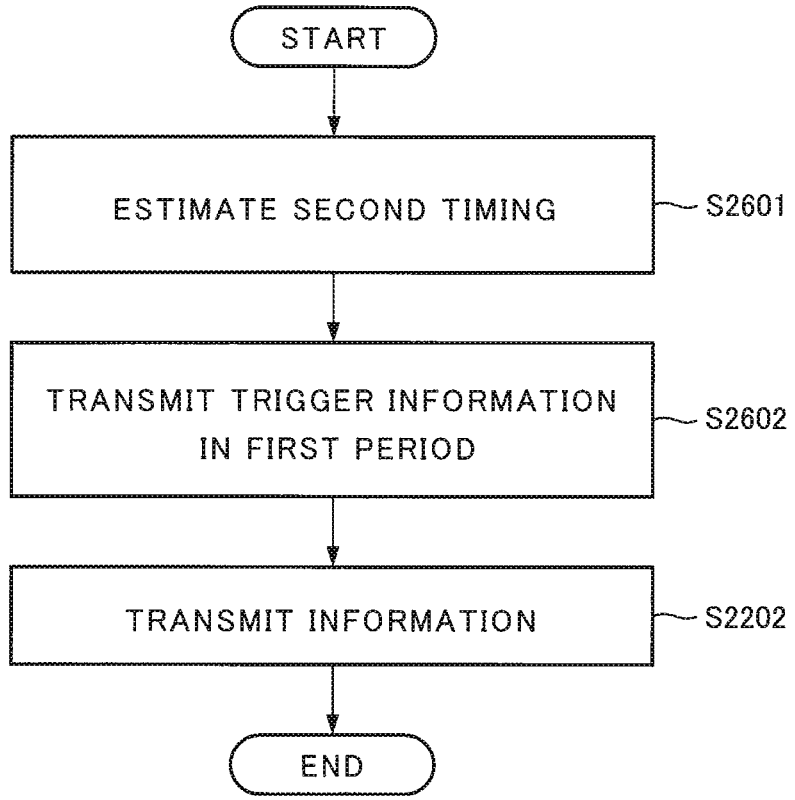
FIG. 6 is a flowchart illustrating a flow of processing in the communication apparatus according to the third exemplary embodiment.
Figure 7:
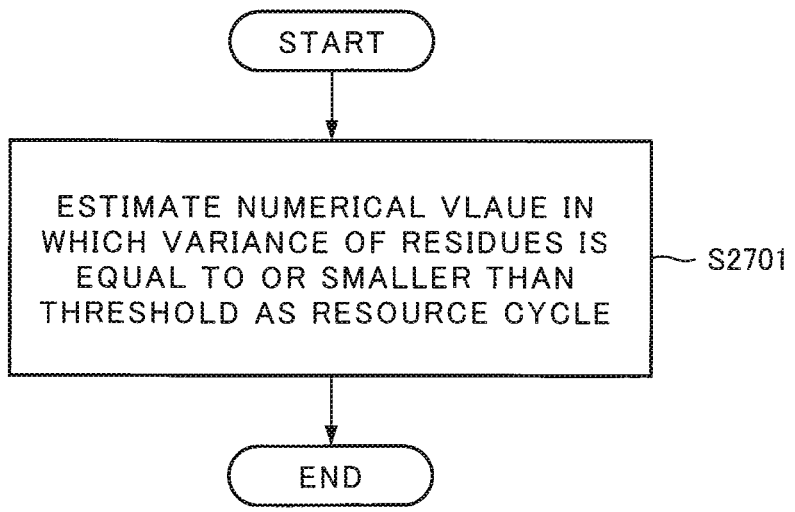
FIG. 7 is a flowchart illustrating a flow of processing in an estimation unit according to the third exemplary embodiment.
Figure 8:
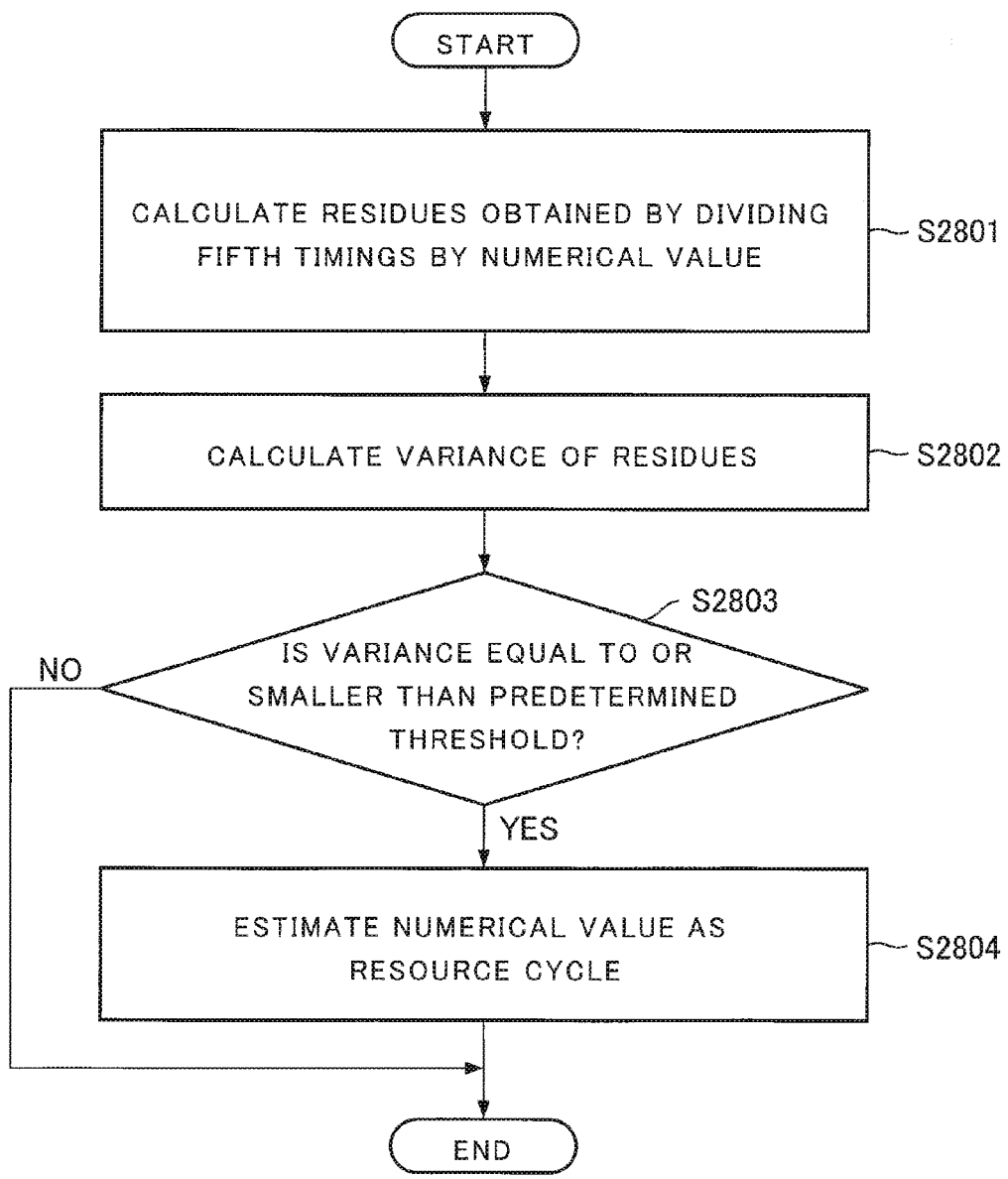
FIG. 8 is a flowchart illustrating a flow of processing for calculating a resource cycle by the estimation unit according to the third exemplary embodiment.
Figure 9:
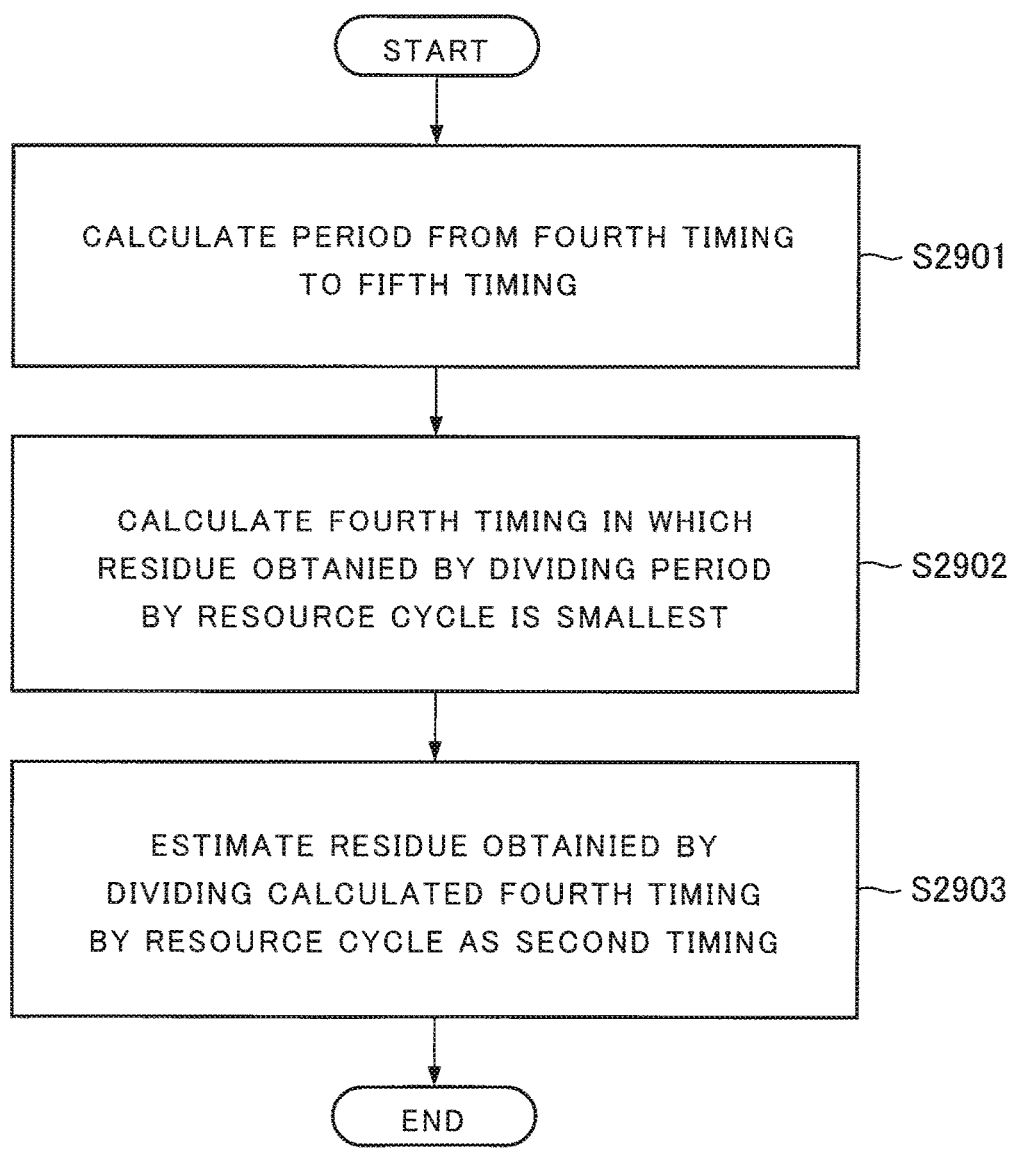
FIG. 9 is a flowchart illustrating a flow of processing for calculating a second timing by the estimation unit according to the third exemplary embodiment.
Figure 10:
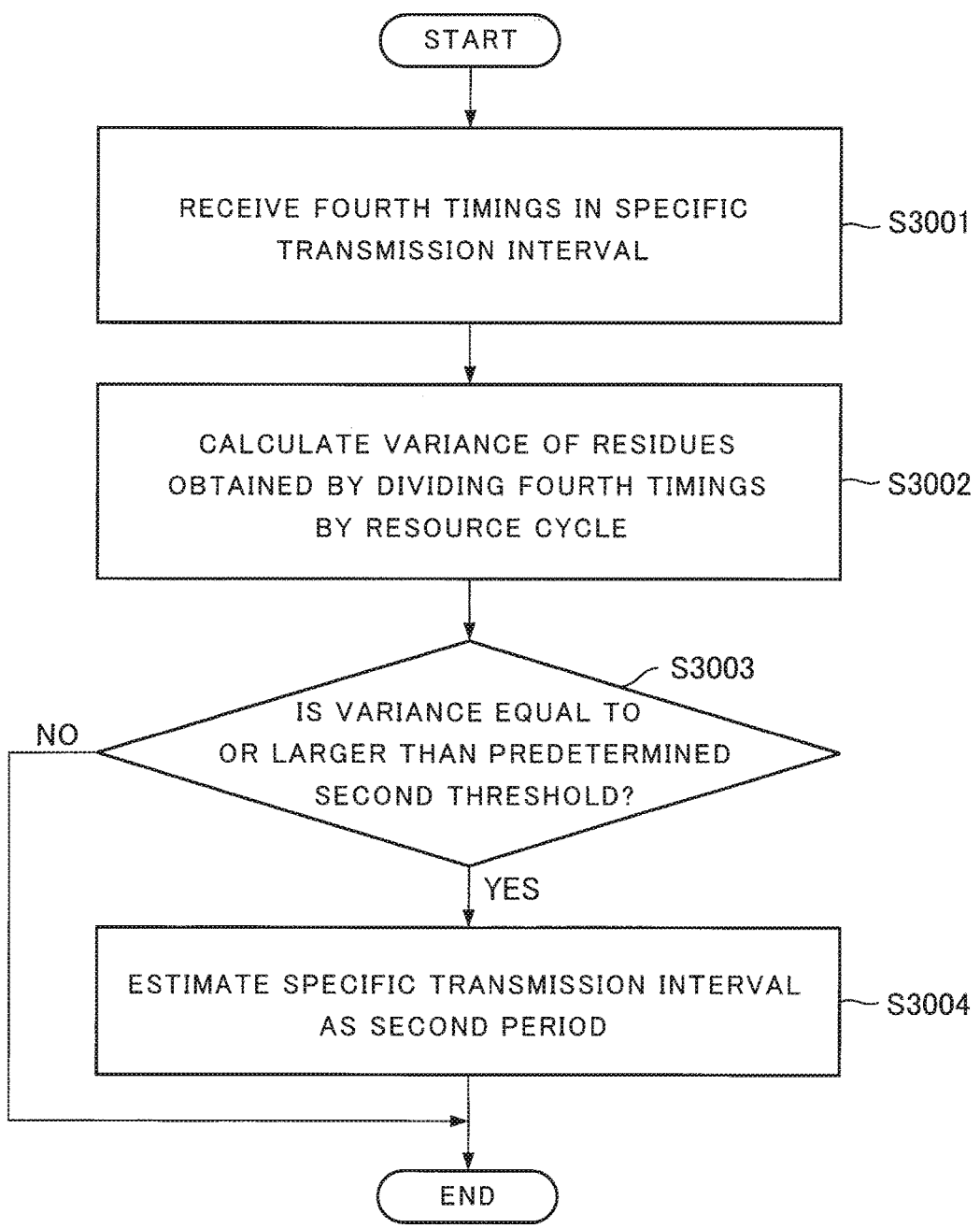
FIG. 10 is a flowchart illustrating a flow of processing for calculating a second period by the estimation unit according to the third exemplary embodiment.

With reference to FIG. 5 to FIG. 10, a configuration of a communication apparatus 1501 according to the third exemplary embodiment and processing executed by the communication apparatus 1501 will be described. FIG. 5 is a block diagram illustrating the configuration of the communication apparatus 1501 according to the third exemplary embodiment of the present invention. FIG. 6 is a flowchart illustrating a flow of processing in the communication apparatus 1501 according to the third exemplary embodiment. FIG. 7 is a flowchart illustrating a flow of processing in an estimation unit 1502 according to the third exemplary embodiment. FIG. 8 is a flowchart illustrating a flow of processing for calculating a resource cycle by the estimation unit 1502 according to the third exemplary embodiment. FIG. 9 is a flowchart illustrating a flow of processing for calculating a second timing by the estimation unit 1502 according to the third exemplary embodiment. FIG. 10 is a flowchart illustrating a flow of processing for calculating a second period by the estimation unit 1502 according to the third exemplary embodiment.

The communication apparatus 1501 according to the third exemplary embodiment includes a transmission unit 1503 and an estimation unit 1502.

First, the estimation unit 1502 estimates a resource cycle in which second communication resources are allocated on the basis of a fourth timing of transmitting a packet and a fifth timing of receiving a packet responding to the packet (step S2601).

The estimation unit 1502 may estimate a second timing when second communication resources are allocated to a request for communication resources for transmitting information, a third timing of releasing allocated second communication resources, or a second period in which communication resources or second communication resources continues to be allocated.

Processing for estimating a resource cycle by the estimation unit 1502 will be described.

The estimation unit 1502 calculates a numerical value satisfying a constraint that a variance, for a plurality of fifth timings, of residues (remainders) obtained by dividing the fifth timings by the numerical value is equal to or smaller than a threshold. The estimation unit 1502 estimates the calculated numerical value as a resource cycle (step S2701). When there are a plurality of calculated numerical values, the estimation unit 1502 may estimate a maximum numerical value as a resource cycle.

It is possible for the estimation unit 1502 to calculate the above-described numerical value, for example, by executing the following processing.

First, the estimation unit 1502 calculates residues obtained by dividing fifth timings by a numerical value (step S2801). The estimation unit 1502 calculates residues for the fifth timings regarding a plurality of packets. Then, the estimation unit 1502 calculates a variance of the residues (step S2802).

In this case, the estimation unit 1502 may divide the calculated residues into a plurality of sections in accordance with magnitudes of the residues and calculate frequencies in each divided section. The estimation unit 1502 may, when calculating frequencies in each divided section, calculate variance of frequencies. For example, the estimation unit 1502 may calculate information entropies, for example, on the basis of the frequencies in each divided section to calculate the above-described variance. In other words, processing for calculating a variance by the estimation unit 1502 is not limited to the above-described example.

Hereinafter, a variance or the like calculated in accordance with the processing will be expressed as a "variation."

In the above-described example, the estimation unit 1502 calculated a variation, but may calculate a kurtosis representing a concentration degree of distributions of residues. In this case, with a decrease in kurtosis, a variation increases.

Then, the estimation unit 1502 determines whether the calculated variance is equal to or smaller than a predetermined threshold (step S2803).

When determining that the variance is equal to or smaller than the predetermined threshold (YES in step S2803), the estimation unit 1502 estimates the numerical value as a resource cycle (step S2804). On the other hand, when determining that the variance exceeds the predetermined threshold (NO in step S2803), the estimation unit 1502 changes the numerical value to repeat processing in step S2801 to step S2804.

In the above-described processing, the estimation unit 1502 may select a numerical value from a predetermined range. Further, it is possible for the estimation unit 1502 to search a predetermined range (e.g. an integer in a range from 2 to 50 (milliseconds, ms)) and select a numerical value allowing a variation to be minimum. The range searched by the estimation unit 1502 is not limited to the above-described example.

In other words, the above-described processing makes it possible for the estimation unit 1502 to calculate a resource cycle.

Further, the estimation unit 1502 calculates periods being a period from fourth timings to fifth timings (step S2901). The estimation unit 1502 may estimate a residue obtained by dividing a fourth timing by a resource cycle as a second timing (step S2903). In this case, the estimation unit 1502 may calculate the fourth timing satisfying a constraint that a residue obtained by dividing the calculated periods by the resource cycle is the smallest (step S2902).

A method for calculating a second period will be described. For convenience of description, a period between two adjacent fourth timings is expressed as a transmission interval.

First, the estimation unit 1502 receives a plurality of fourth timings in a specific transmission interval (step S3001). The estimation unit 1502 calculates a variance of residues obtained by dividing the fourth timings received in the specific transmission interval by a resource cycle (step S3002) and determines whether the calculated variance is equal to or greater than a predetermined second threshold (step S3003).

When determining that the variance is equal to or greater than the predetermined second threshold (YES in step S3003), the estimation unit 1502 estimates the specific transmission interval as a second period (step S3004). The estimation unit 1502 estimates a maximum specific transmission interval as the second period when there are a plurality of specific transmission intervals that satisfy the above-described condition.

When determining that the variance is smaller than the predetermined second threshold (NO in step S3003), the estimation unit 1502 changes the specific transmission interval to execute processing in step S3001 to step S3004.

The estimation unit 1502 estimates a second period by the above-described processing.

As described above, the base station 1105 allocates second communication resources at a second timing. When an interval of the second timing is constant (a value thereof is expressed as a "resource cycle"), the base station 1105 allocates communication resources at a resource cycle.

Figure 11:
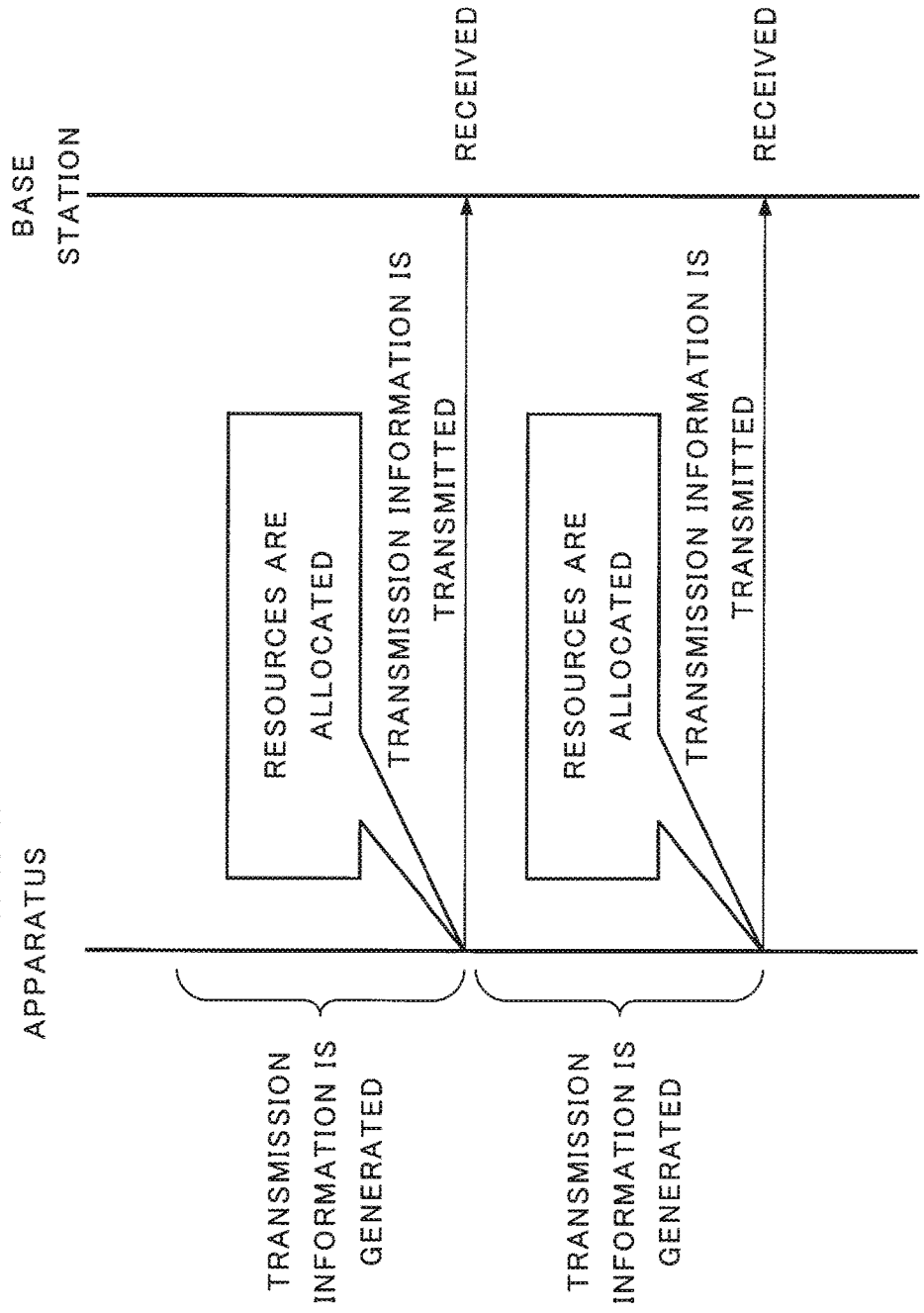
FIG. 11 is a sequence diagram illustrating a flow of processing in the communication apparatus and the base station.

When, for example, as illustrated in FIG. 11, information to be transmitted is made, the communication apparatus 1501 transmits the information using the allocated communication resources in accordance with allocation of communication resources at a resource cycle by the base station 1105. FIG. 11 is a sequence diagram illustrating a flow of processing in the communication apparatus 1501 and the base station 1105.

On the other hand, the communication apparatus 1501 transmits a first message using second communication resources and also transmits information using first communication resources.

When the communication apparatus 1501 transmits information immediately after allocation of the first communication resources at a second timing, a fourth timing occurs in accordance with the second timing. In this case, a difference between the second timing and the fourth timing is substantially constant, and therefore, the above-described residue becomes constant. In many cases, the communication apparatus 1501 transmits information immediately after the first communication resources are allocated to the second timing. As a result, the second timing and the fourth timing occur at a resource cycle, and therefore, when the fourth timing is divided by the resource cycle, a residue has a constant value. On the other hand, when the fourth timing is divided by another value, a residue does not have a constant value since the resource cycle and the another value are different from each other.

Therefore, as described above, the estimation unit 1502 can accurately estimate a resource cycle on the basis of a numerical value in the case that a variance of residues is equal to or smaller than a threshold (e.g. the variance is 0 for a constant value). Further, a fifth timing occurs at the resource cycle in the manner similar to the fourth timing, and therefore, the estimation unit 1502 can accurately estimate a second timing and a second period using the above-described processing.

Then, the transmission unit 1503 transmits trigger information on the basis of the second timing estimated by the estimation unit 1502 (step S2602).

The communication apparatus 1501 according to the third exemplary embodiment includes the configuration similar to the first exemplary embodiment, and therefore, the third exemplary embodiment can have the advantageous effect similar to the first exemplary embodiment. In other words, according to the communication apparatus 1501 of the third exemplary embodiment, a communication delay can be reliably reduced.

Fourth Exemplary Embodiment

Next, a fourth exemplary embodiment of the present invention based on the above-described first exemplary embodiment will be described.

In the following description, characteristic portions according to the present exemplary embodiment will be mainly described, and the same configuration as in the first exemplary embodiment will be assigned with the same reference number to omit overlapping description.

Figure 12:
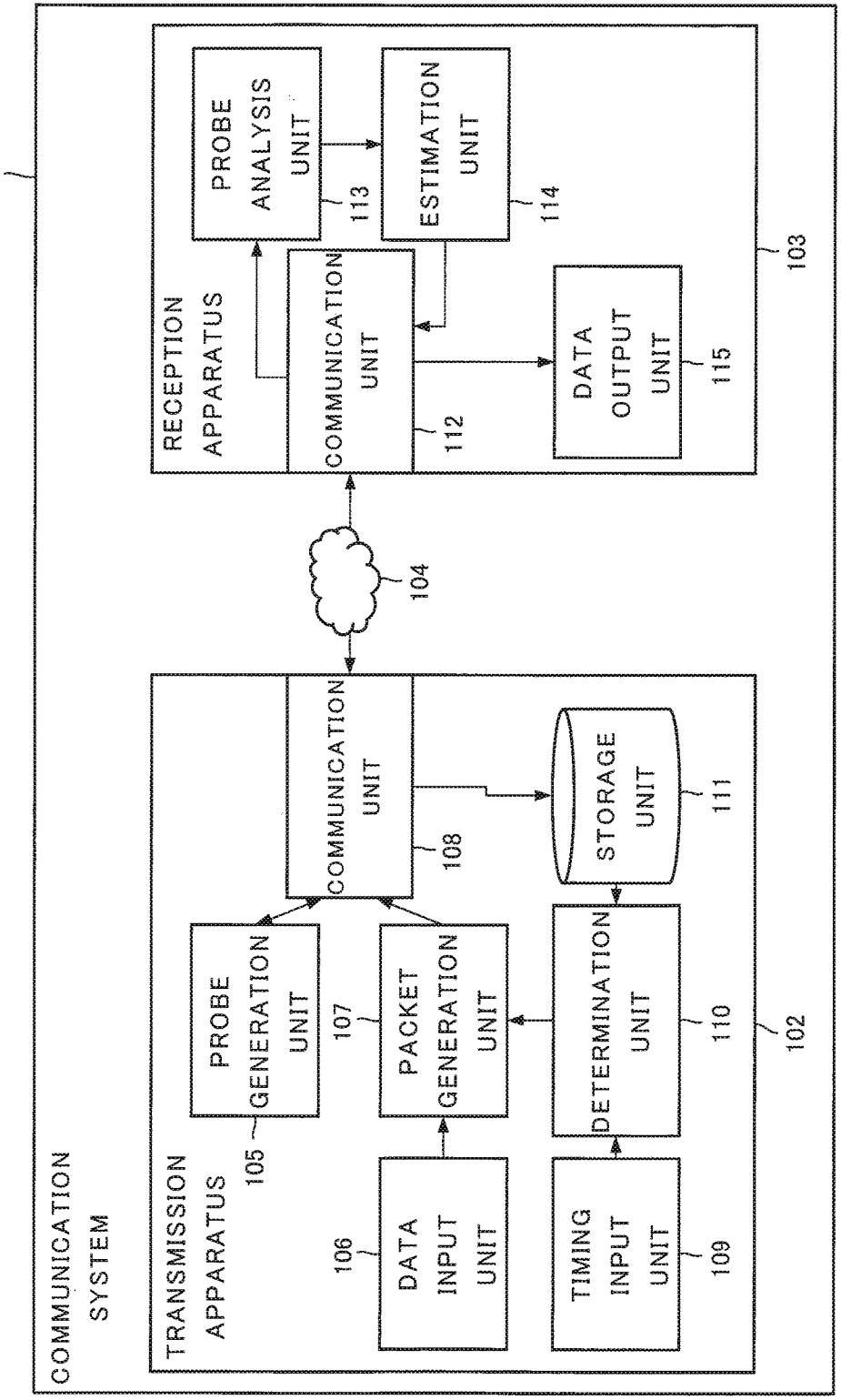
FIG. 12 is a block diagram illustrating the configuration of the communication system according to the fourth exemplary embodiment of the present invention.
Figure 13:
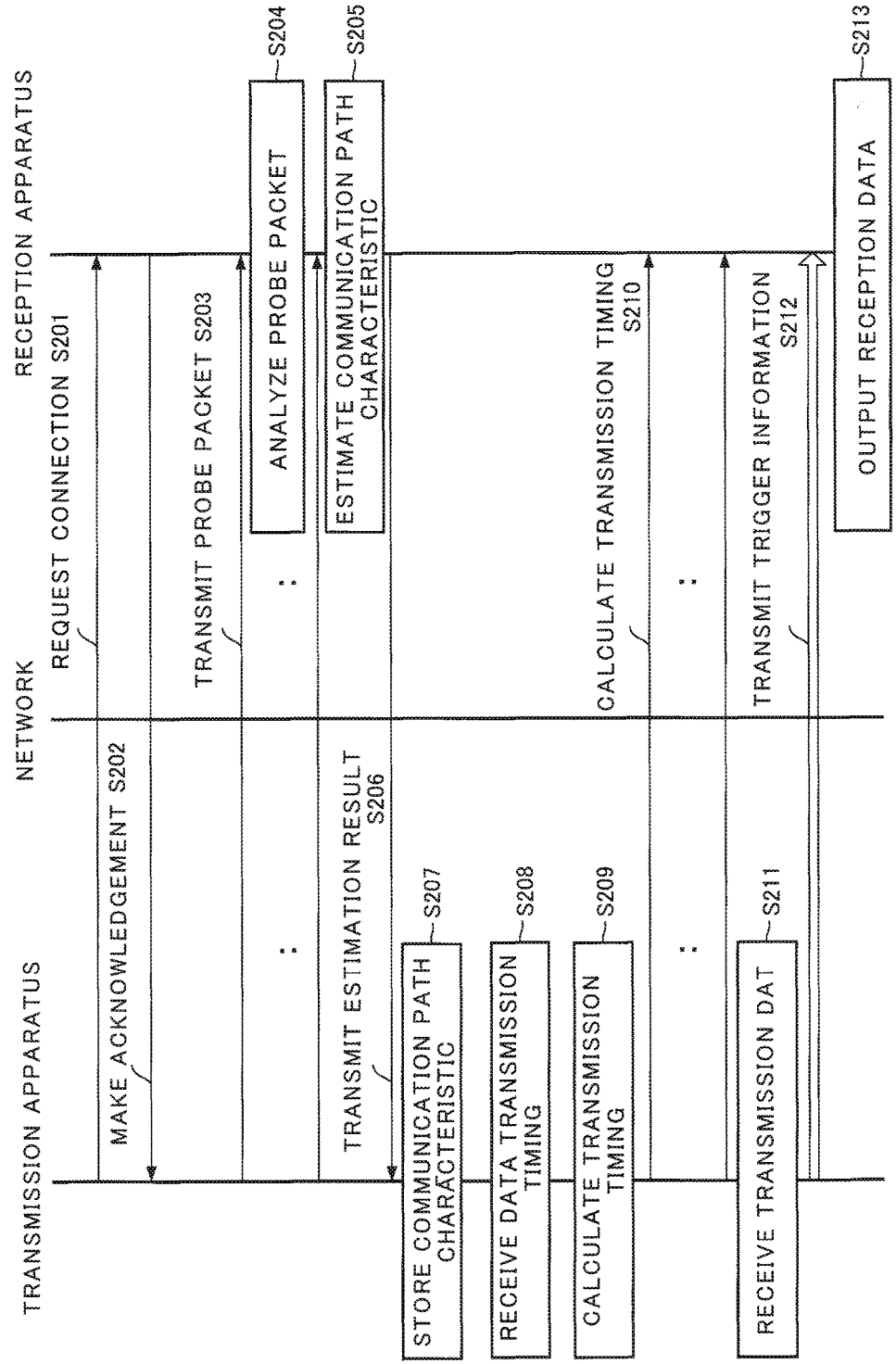
FIG. 13 is a sequence diagram illustrating a flow of processing in the communication system according to the fourth exemplary embodiment.

With reference to FIG. 12 and FIG. 13, a configuration of a communication system 101 according to the fourth exemplary embodiment and processing executed by the communication system 101 will be described. FIG. 12 is a block diagram illustrating the configuration of the communication system 101 according to the fourth exemplary embodiment of the present invention. FIG. 13 is a sequence diagram illustrating a flow of processing in the communication system 101 according to the fourth exemplary embodiment.

The communication system 101 includes a transmission apparatus 102, a reception apparatus 103, and a communication network 104.

The transmission apparatus 102 includes a probe generation unit 105, a data input unit 106, a timing input unit 109, a packet generation unit 107, a determination unit 110, a communication unit 108, and a storage unit 111.

The reception apparatus 103 includes a communication unit 112, a probe analysis unit 113, an estimation unit 114, and a data output unit 115.

The transmission apparatus 102 can execute transmission/reception of information to/from the reception apparatus 103 and the communication network 104 by way of the communication unit 108.

The probe generation unit 105 calculates a timing of transmitting a probe packet and transmits the probe packet to the reception apparatus 103 at the timing.

The probe packet is a packet for examining a timing of allocating communication resources and a communication path characteristic regarding a period or the like (i.e. the above-described second period, hereinafter, referred to as a "resource managing continuation period") in which communication resources continues to be allocated in the communication network 104.

The reception apparatus 103 estimates a communication path characteristic regarding the communication network 104 on the basis of a communication delay in transmission/ reception of the probe packet made by the probe generation unit 105 and stores the estimated communication path characteristic to the storage unit 111.

The data input unit 106 receives information (data) to be transmitted from an application program or the like (not illustrated).

The timing input unit 109 acquires a timing of transmitting the information from the application program or the like.

The determination unit 110 calculates a timing of transmitting trigger information that manages communication resources on the basis of the timing acquired by the timing input unit 109 and the communication path characteristic.

The packet generation unit 107 generates a data packet on the basis of the information received by the data input unit 106 and generates trigger information at the timing calculated by the determination unit 110.

The reception apparatus 103 executes transmission/reception of information to/from the transmission apparatus 102 or the like using the communication unit 112.

The reception apparatus 103 receives a probe packet. The probe analysis unit 113 reads information included in the received probe packet.

The estimation unit 114 estimates a timing of managing communication resources or a communication path characteristic regarding resources managing continuation period or the like in the communication network 104 on the basis of the information read by the probe analysis unit 113.

The data output unit 115 transmits information to be transmitted to an application program or the like (not illustrated).

The communication unit 108 transmits a message (request) representing a request for a connection to the reception apparatus 103 to the communication unit 112 (step S201).

The communication unit 112 receives the message and transmits an acknowledgement (reply) responding to the received message to the communication unit 108 (step S202). The communication unit 108 receives the reply, and thereby a communication connection is established.

The request and the reply are messages in which parameters for controlling communication upon transmission/reception of information are interchangeable. The request and the reply may be made not only in one round trip but also at multiple times. Further, the communication unit 112 may issue a request to the communication unit 108. Further, when it is unnecessary to exchange parameters, it may be unnecessary for the communication unit 108 and the communication unit 112 to execute the above-described processing.

Then, the probe generation unit 105 calculates a timing of transmitting a probe packet regarding the communication network 104 on the basis of a specific transmission interval. The probe generation unit 105 transmits the probe packet to the reception apparatus 103 at the calculated timing (step S203).

The reception apparatus 103 receives the probe packet and transmits the received timing and the received probe packet to the probe analysis unit 113.

The probe analysis unit 113 receives the timing and the probe packet and reads information included in the probe packet (step S204). The probe analysis unit 113 transmits the received timing and the read information to the estimation unit 114.

The estimation unit 114 receives the timing and the information transmitted by the probe analysis unit 113. After receiving a series of probe packets regarding the timing calculated by the probe generation unit 105, the estimation unit 114 estimates a communication path characteristic on the basis of the information and the timing (step S205). The estimation unit 114 transmits the estimated communication path characteristic to the transmission apparatus 102 (step S206).

The transmission apparatus 102 receives the communication path characteristic and stores the received communication path characteristic to the storage unit 111 (step S207) and also transmits the communication path characteristic to the probe generation unit 105.

The probe generation unit 105 changes the specific transmission interval of a probe packet and repeats processing of step S203 to step S207.

Thereafter, when receiving a tenth timing of a subsequent transmission of information from an application program or the like (step S208), the timing input unit 109 transmits, the tenth timing to the determination unit 110.

The determination unit 110 receives the tenth timing and calculates a timing of transmitting trigger information on the basis of the tenth timing and the communication path characteristic information (step S209). The determination unit 110 transmits the calculated timing to the packet generation unit 107.

The packet generation unit 107 receives the timing and also generates trigger information to be transmitted at the timing. Then, the packet generation unit 107 transmits the made trigger information to the reception apparatus 103 at the received timing (step S210). The data input unit 106 receives information to be transmitted (step S211) and transmits the received information to the packet generation unit 107. The packet generation unit 107 receives the information, converts the received information to packet data, and transmits the packet data obtained by the conversion to the reception apparatus 103 (step S212).

The reception apparatus 103 receives the packet data and outputs the received packet data to an application program or the like via the data output unit 115 (step S213). Processing in step S208 to step S213 is repeated until transmission of information is terminated.

Next, an advantageous effect of the communication system 101 according to the fourth exemplary embodiment will be described. The communication system 101 according to the present exemplary embodiment estimates a communication path characteristic regarding the communication network 104 before transmitting information from the transmission apparatus 102 to the reception apparatus 103. Thereafter, the communication system 101 calculates a timing of transmitting trigger information on the basis of the communication path characteristic and transmits trigger information at the calculated timing.

Therefore, according to the communication system 101 of the present exemplary embodiment, at a timing of transmitting information, communication resources has been allocated, and therefore, a communication delay can be reduced.

Next, one example of realizing the estimation unit 1502 according to the third exemplary embodiment will be described.

As described above, a base station (e.g. the base station 1105 illustrated in FIG. 1) allocates second communication resources at a second timing. When an interval of the second timing is constant (the constant interval is expressed as a "resource cycle"), the base station allocates the second communication resources at the second timing and thereafter allocates first communication resources that transmit information.

On the other hand, the communication apparatus 1501 (i.e. the transmission apparatus 102) transmits a first message using the second communication resources and also transmits information using the first communication resources.

The probe generation unit 105 transmits a plurality of probe packets to the base station 1105 while changing a specific transmission interval of a probe packet. In this case, the probe generation unit 105 transmits a probe packet at timings in which residues obtained by dividing timings (hereinafter, expressed as "twelfth timings") of transmitting a probe packet by a resource cycle are different from each other.

When, for example, the resource cycle is several ten milliseconds (hereinafter, expressed as "ms"), the probe generation unit 105 transmits a probe packet at timings in which residues obtained by dividing twelfth timings by 100 (ms) vary between 0 (ms) and 99 (ms). The probe generation unit 105 generates a probe packet including a twelfth timing and an identification number that identifies the probe packet.

The communication unit 112 receives the probe packet. The communication unit 112 transmits information included in the received probe packet and a timing when the probe packet has been received (hereinafter, expressed as an "eleventh timing") (i.e. equivalent to the above-described reply) to the probe analysis unit 113.

The probe analysis unit 113 receives the information and the eleventh timing. The probe analysis unit 113 reads a twelfth timing included in the received information and the identification number, and transmits the read twelfth timing, identification number and the eleventh timing to the estimation unit 114.

The above-described processing is repeated for a series of probe packet streams.

After completion of processing for the series of probe packet streams, the estimation unit 114 estimates a resource cycle.

The estimation unit 114 calculates residues obtained by dividing the eleventh timings by x (x is positive) and a variance of the residues, and estimates x in which the calculated variance is equal to or smaller than a predetermined threshold as a resource cycle.

Figure 14:
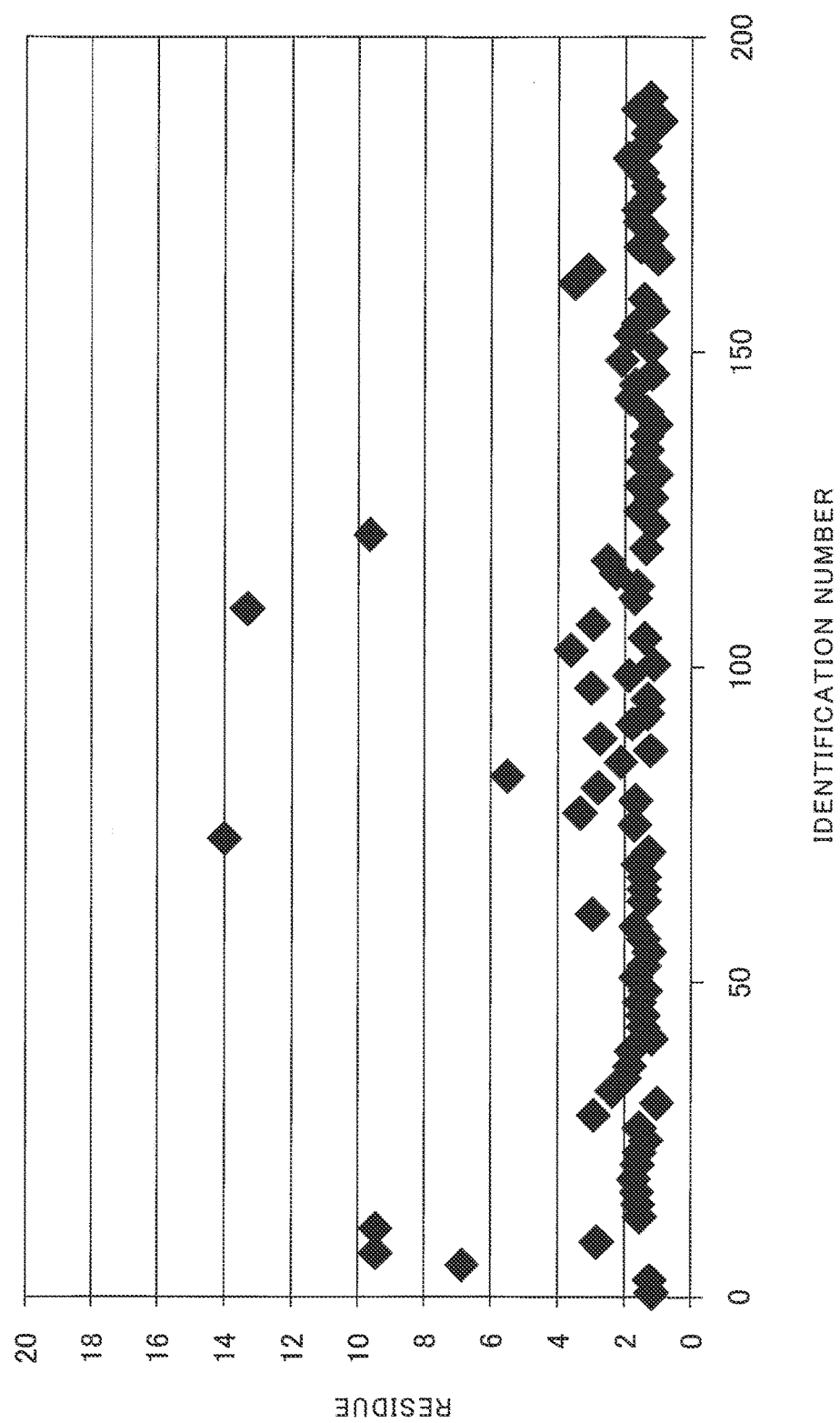
FIG. 14 is a diagram illustrating one example of residues obtained by dividing the eleventh timings by 20 (ms).
Figure 15:
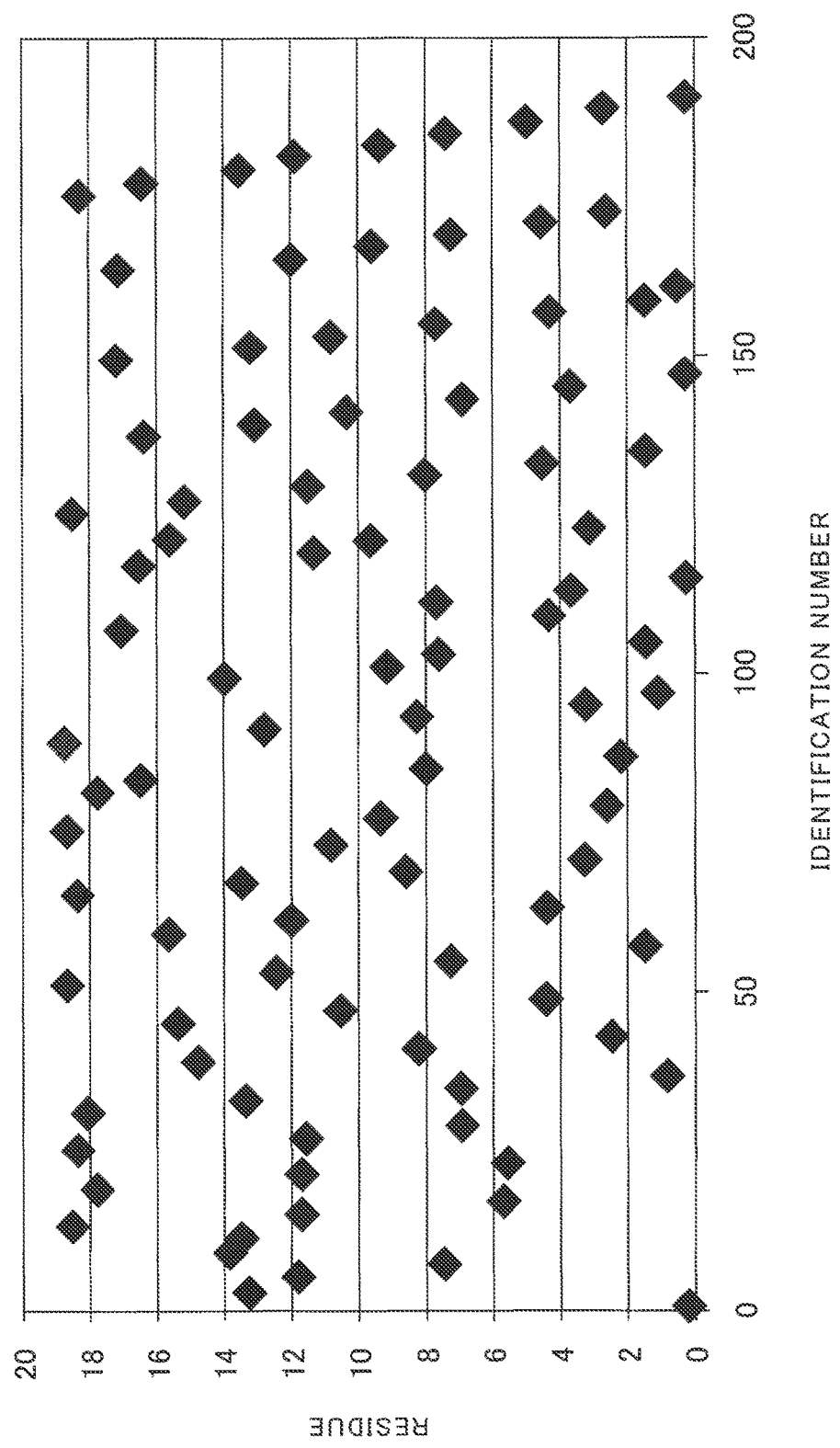
FIG. 15 is a diagram illustrating one example of residues obtained by dividing the eleventh timings by 19 (ms).

One example in which the estimation unit 114 calculates a resource cycle on the basis of residues calculated based on the eleventh timings will be described with reference to FIG. 14 and FIG. 15. FIG. 14 is a diagram illustrating one example of residues obtained by dividing the eleventh timings by 20 (ms). FIG. 15 is a diagram illustrating one example of residues obtained by dividing the eleventh timings by 19 (ms). The vertical axis in FIG. 14 and FIG. 15 represents a residue, and the horizontal axis in FIG. 14 and FIG. 15 represents an identification number that identifies a probe packet.

When the estimation unit 114 calculates residues obtained by dividing the eleventh timings by 20 (ms), a large number of the calculated residues appear in a range from 1 to 2 (ms) (i.e. a specific value) (FIG. 14). The eleventh timing frequently occurs in association with a second timing, and in this case, residues obtained by dividing the eleventh timings by a resource cycle are localized near a certain specific value. Therefore, a variance of the residues is equal to or smaller than a threshold, and therefore the estimation unit 114 estimates that the resource cycle is 20 (ms) in the communication network 104.

On the other hand, when x is different from the resource cycle, residues obtained by dividing the eleventh timings by x are not localized near a specific value (FIG. 15).

A method for determining whether residues are localized near a specific value in the estimation unit 114 will be described. For convenience of description, a number of residues, that obtained by dividing the eleventh timings by x, included in an area from i to (i+1) is expressed as D. Further, a number of the eleventh timings is expressed as C.

The estimation unit 114 calculates, for example, a concentration degree (in this case, a maximum value of D/C, "/" denotes division) and estimates, when the concentration degree exceeds a predetermined value, x in which the concentration degree is maximum as a resource cycle. A method for calculating a resource cycle by the estimation unit 114 is not limited to the above-described method.

The estimation unit 114 transmits the calculated resource cycle to the transmission apparatus 102 via the communication unit 112 and the communication network 104. The communication apparatus 102 receives the resource cycle, then stores the received resource cycle to the storage unit 111, and also transmits the resource cycle to the probe generation unit 105.

The probe generation unit 105 receives the resource cycle and determines a twelfth timing in which a communication delay is minimum on the basis of the received resource cycle. The probe generation unit 105 calculates twelfth timings so that, for example, residues obtained by dividing the twelfth timings by a resource cycle are distributed from 0 to (x−1). The probe generation unit 105 transmits probe packets at the calculated twelfth timings.

The estimation unit 114 determines a twelfth timing in which a communication delay (i.e. "the eleventh timing"-"a twelfth timing") is minimum for residues obtained by dividing the twelfth timings regarding the transmission apparatus 102 by x.

Figure 16:
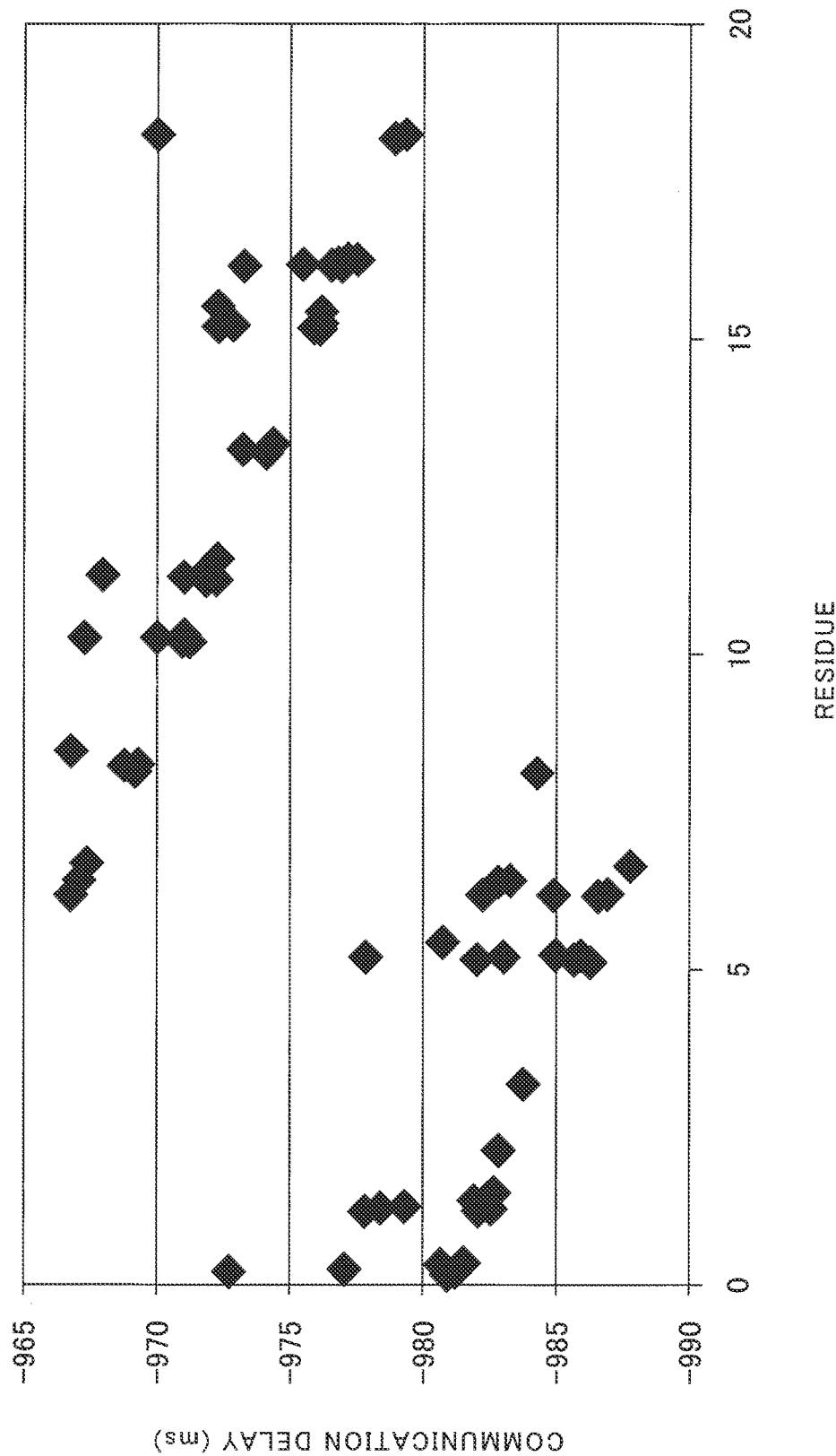
FIG. 16 is a diagram illustrating one example of a relevance between a residue and a communication delay.

With reference to FIG. 16, a relevance between a residue obtained by dividing a twelfth timing by a resource cycle and a communication delay will be described. FIG. 16 is a diagram illustrating one example of a relevance between a residue and a communication delay. The vertical axis in FIG. 16 represents a communication delay. The horizontal axis in FIG. 16 represents a residue. In this example, the communication delay has a negative value. The reason is that timings in the transmission apparatus 102 and the reception apparatus 103 are not synchronized with each other. Even when the communication delay is negative, it is only necessary to make a relative variation clear, and therefore, there is no problem in calculation of a twelfth timing by the estimation unit 114.

When a residue increases from 0, a communication delay decreases in increments of −1 (ms). The communication delay becomes minimum at a position where the residue is close to 6, and when the residue increases from 6, the communication delay increases by 20 (ms). When the residue further increases, the communication delay decreases in increments of −1 (ms).

In this example, when the residue is approximately 6, the communication delay becomes minimum, and therefore, the estimation unit 114 estimates that a base station (e.g. the base station 1105 in FIG. 1) allocates communication resources at a twelfth timing when a residue obtained by dividing the twelfth timing by a resource cycle is approximately 6. The reception apparatus 103 transmits the calculated residue ("6" in this case) to the transmission apparatus 102.

However, even when the residue is 6, there are cases in which the communication delay is minimum and the communication delay increases by 20 (ms). The reason is that due to occurrence of a communication delay resulting from processing in an operating system or the like, the transmission apparatus 102 fails to transmit PUCCH in time. Therefore, the estimation unit 114 may calculate a value equal to or smaller than a residue in which the communication delay is minimum. In the above-described example, the residue is, for example, a value from 4 to 5.

In other words, the estimation unit 114 estimates that a resource cycle is 20 (ms) in the communication network 104 (e.g. LTE) where the transmission apparatus 102 is communicable and that trigger information is transmitted when a residue obtained by dividing a twelfth timing by the resource cycle is 6. Therefore, in this case, a communication delay resulting from managing communication resources is minimum.

Then, the estimation unit 114 estimates a continuation period in which resources continue to be managed.

When communication resources are released in accordance with a fact in which a base station determines that a terminal does not communicate, it is impossible for the terminal to transmit information until the base station allocates communication resources. Therefore, the eleventh timing occurs in association with a second timing of allocating the communication resources by the base station. As a result, residues obtained by dividing the eleventh timings by a resource cycle appear near a specific value.

On the other hand, when the base station continuously allocates communication resources to the terminal, an eleventh timing occurs without regard to a second timing. Therefore, residues obtained by dividing eleventh timings by a resource cycle are distributed. The probe generation unit 105 transmits a probe packet while changing a transmission interval in a plurality of twelfth timings.

The estimation unit 114 determines a maximum transmission interval in which residues obtained by dividing timings of receiving probe packets by a resource cycle are not concentrated in a specific value and transmits the determined transmission interval to the transmission apparatus 102.

The transmission apparatus 102 receives the transmission interval transmitted by the estimation unit 114 and stores the received transmission interval to the storage unit 111. The estimation unit 114 determines whether transmission intervals are concentrated near a specific value, for example, on the basis of the above-described predetermined threshold.

Next, with reference to an example, processing in the communication system 101 according to the present exemplary embodiment will be described.

For convenience of description, it is assumed that a resource managing continuation period is 7. Further, it is assumed that the transmission apparatus 102 transmits information via VoIP (Voice_over_IP) in which voice communication is performed using a packet communication network (communication network). Further, it is assumed that a cycle of transmitting a packet is 20 (ms).

After 20 (s) from a timing of initiating processing in accordance with an application program using VoIP, the application program transmits a voice packet to the data input unit 106. Thereafter, the application program transmits a voice packet to the data input unit 106 at a 20 (ms) interval (i.e. transmission interval).

It is assumed that a timing of initiating processing in accordance with an application program is 1000 (ms).

The application program outputs 1020 (ms) to the timing input unit 109. In order to manage communication resources that transmit a voice packet at 1020 (ms), it is necessary for the application program to manage communication resources at 1006 (ms) and continue to manage the communication resources until 1020 (ms). The determination unit 110 determines to transmit trigger information at a timing of 1005 (ms) in order to manage communication resources. Further, the determination unit 110 determines to transmit trigger information at 1010 (ms) and at 1015 (ms) in order to continue to manage the managed communication resources.

The determination unit 110 instructs the packet generation unit 107 to transmit trigger information at the above-described timings. The packet generation unit 107 receives the instruction and transmits the trigger information on the basis of the received instruction.

At the timing when the application program outputs a voice packet to the data input unit 106 at 1020 (ms), communication resources that transmit the voice packet has been managed by the trigger information. Therefore, the application program can transmit the voice packet without a communication delay.

Thereafter, the application program may output, to the timing input unit 109, a timing of 1040 (ms) of transmitting a next voice packet. The determination unit 110 determines to transmit trigger information at 1045 (ms), 1050 (ms), and 1055 (ms) in order to manage communication resources that transmit a voice packet.

Next, an example in which an application program uploads log data on a server at a 1000 (ms) interval (i.e. transmission interval) will be described. It is assumed that the application program initiates processing at 20000 (ms).

The application program transmits 21000 (ms) to the timing input unit 109 as a timing of transmitting a packet regarding log data.

A base station allocates communication resources at 20986 (ms) and thereafter does not allocate communication resources until 21000 (ms). The determination unit 110 determines that trigger information is transmitted at 20985 (ms), 20990 (ms), and 20995 (ms).

The application program transmits a packet regarding log data at 21000 (ms) using the communication resources. As a result, it is unnecessary for the application program to newly be allocated a communication resource at 21000 (ms).

Therefore, according to the communication system 101 of the present exemplary embodiment, a communication delay can be reduced. Specifically, when an interval of transmitting log data is long, it is possible to markedly reduce a number of pieces of trigger information to be transmitted, compared with the apparatuses disclosed by PTL 1 and PTL 2.

Further, it is not always necessary for the application program to transmit a timing of transmitting a next packet to the time input unit 109. In this case, the communication system 101 according to the present exemplary embodiment transmits a probe packet at an interval equal to or smaller than a period when managed communication resources continue to be managed. Even in such a case, according to the communication system 101 of the present exemplary embodiment, it is necessary only to transmit packets the minimum times for managing communication resources and therefore, a communication amount can be reduced.

The communication system 101 according to the fourth exemplary embodiment includes the configuration similar to the first exemplary embodiment, and therefore, the fourth exemplary embodiment can have the advantageous effect similar to the first exemplary embodiment. In other words, according to the communication system 101 of the fourth exemplary embodiment, a communication delay can be reliably reduced.

Further, even when a second timing is uncertain from the processing for estimating a second timing by the estimation unit 114, the communication system 101 according to the present exemplary embodiment can reliably reduce a communication delay. In other words, a range to which the communication system 101 according to the present exemplary embodiment is applicable is expanded.

In the above description, a resource cycle had an integer value but may have a decimal.

When a terminal transmits information immediately after first communication resources are allocated, a fourth timing occurs in accordance with a second timing. In this case, a difference between the second timing and the fourth timing is substantially constant, and therefore, the above-described residue is substantially constant.

When, for example, a base station transmits information to the reception apparatus 103 via both the Internet and a fixed access line, a communication delay is hardly changed. In this case, also when the reception apparatus 103 transmits information, a communication delay is not substantially changed.

In the above-described example, as a unit, millisecond (ms) was employed, but another unit is employable.

Fifth Exemplary Embodiment

Next, a fifth exemplary embodiment of the present invention based on the above-described fourth exemplary embodiment will be described.

In the following description, characteristic portions according to the present exemplary embodiment will be mainly described, and the configuration similar to the fourth exemplary embodiment will be assigned with the same reference number to omit overlapping description.

The fifth exemplary embodiment is one example that realizes the above-described exemplary embodiment.

Figure 17:
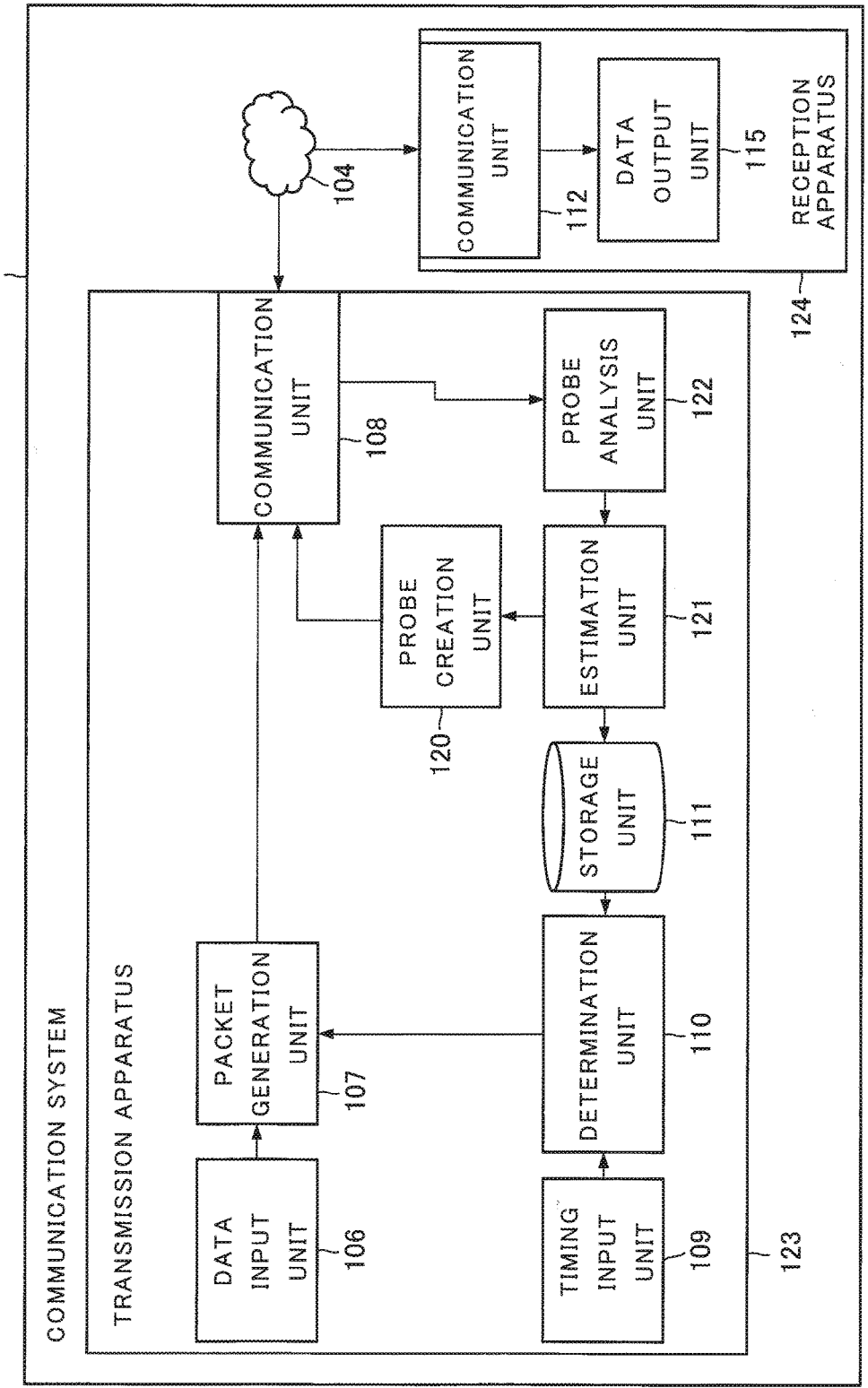
FIG. 17 is a block diagram illustrating the configuration of the communication system according to the fifth exemplary embodiment of the present invention.
Figure 18:
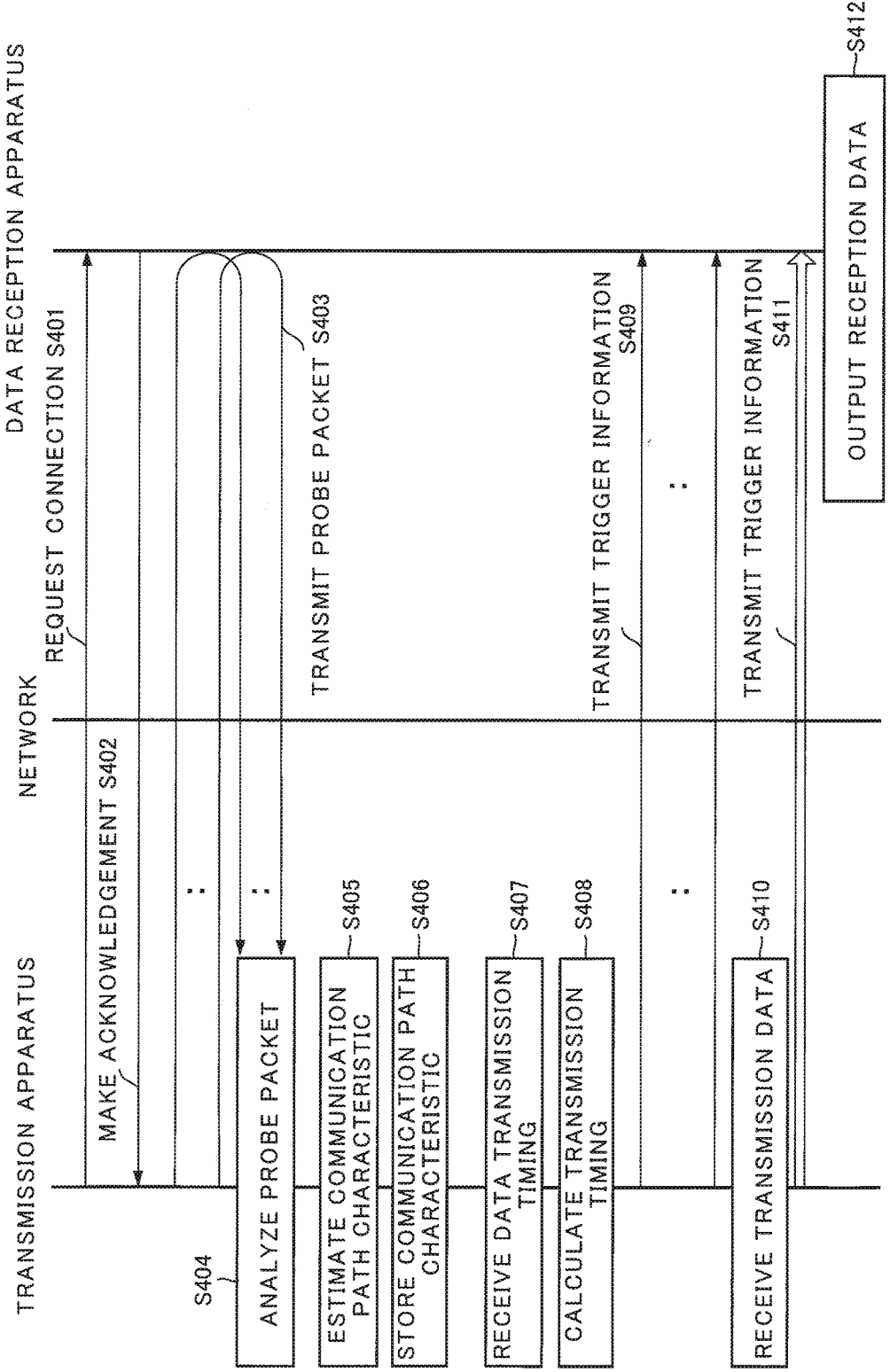
FIG. 18 is a sequence diagram illustrating one example of a flow of processing in the communication system according to the fifth exemplary embodiment.

With reference to FIG. 17 and FIG. 18, a configuration of a communication system 125 according to the fifth exemplary embodiment and processing executed by the communication system 125 will be described. FIG. 17 is a block diagram illustrating the configuration of the communication system 125 according to the fifth exemplary embodiment of the present invention. FIG. 18 is a sequence diagram illustrating one example of a flow of processing in the communication system 125 according to the fifth exemplary embodiment.

In the fourth exemplary embodiment, the reception apparatus 103 was configured to include the probe analysis unit 113 and the estimation unit 114. In contrast, the fifth exemplary embodiment is different from the configuration of the fourth exemplary embodiment in that a transmission apparatus 123 includes a probe analysis unit 122 and an estimation unit 121.

In this case, a probe generation unit 120 calculates a timing of transmitting a probe packet for estimating a characteristic regarding the communication network 104 on the basis of a specific transmission interval. The probe generation unit 120 transmits a probe packet to a reception apparatus 124 at the calculated timing via the communication unit 108.

The communication unit 108 transmits a message (request) representing a request for a connection to the reception apparatus 124 to the communication unit 112 (step S401).

The communication unit 112 receives the message and transmits an acknowledgement (reply) responding to the received message to the communication unit 108 (step S402). The communication unit 108 receives the reply, and then a communication connection is established.

The transmission apparatus 123 transmits the received probe packet to the reception apparatus 124 (step S403).

The reception apparatus 124 receives the probe packet transmitted by the transmission apparatus 123 and transmits the received eleventh timing and the received probe packet (i.e. equivalent to the above-described reply) to the probe analysis unit 122.

The probe analysis unit 122 receives the probe packet and reads information included in the received probe packet (step S404), and transmits the eleventh timing and the read information to the estimation unit 121.

After completion of reception of the probe packet at the calculated timing, the estimation unit 121 estimates a communication path characteristic on the basis of the information included in the probe packet and the eleventh timing (step S405). The estimation unit 121 stores the estimated communication path characteristic to the storage unit 111 (step S406) and also transmits the communication path characteristic to the probe generation unit 120.

The probe generation unit 120 repeats processing in step S403 to step S406 while changing the interval of transmitting a probe packet.

Processing in step S407 to step S412 is similar to the processing (i.e. step S208 to step S213) described in the fourth exemplary embodiment. Therefore, description on the following processing will be omitted.

Figure 19:
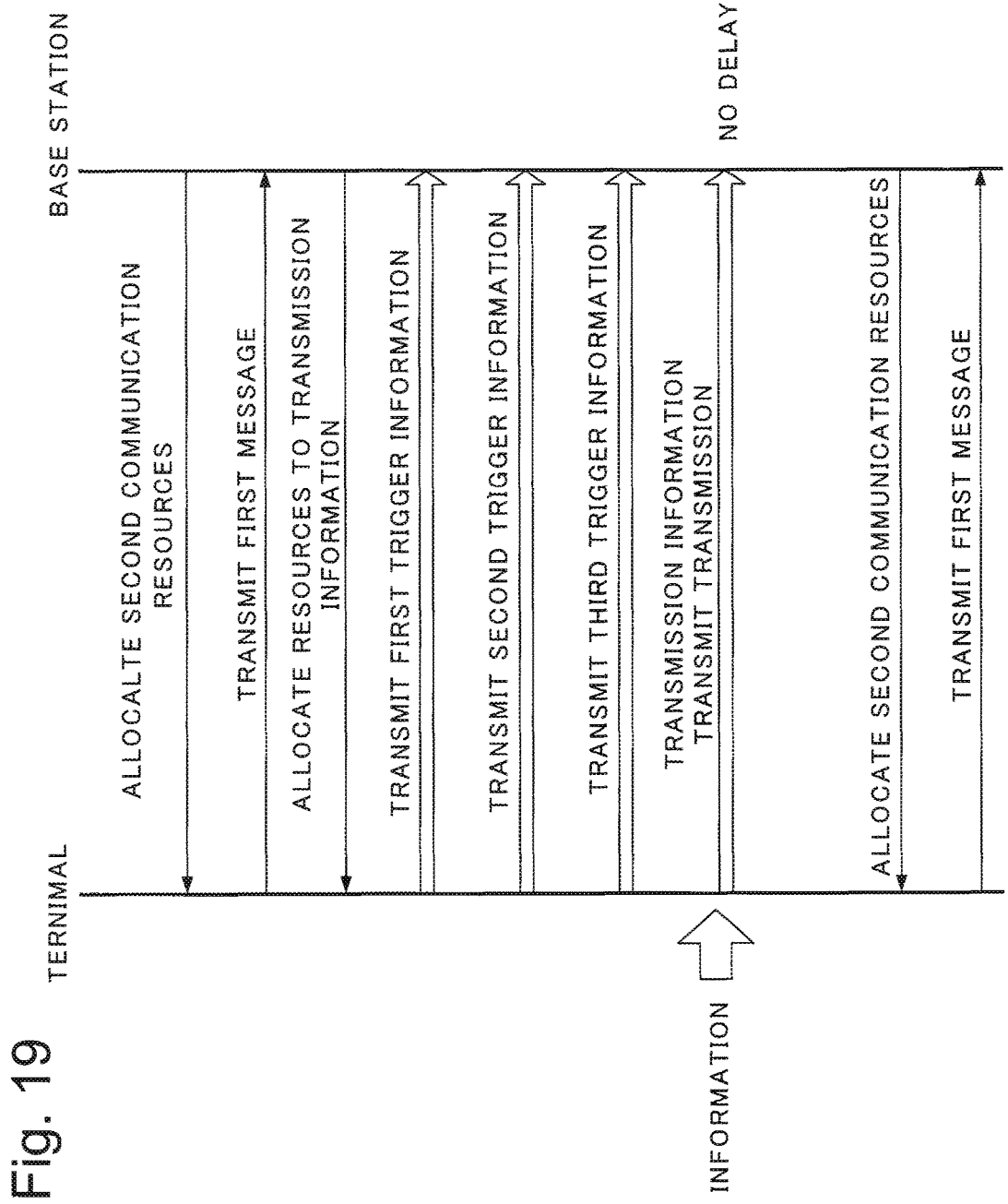
FIG. 19 is a sequence diagram illustrating one example of a flow of processing in the communication system according to the fifth exemplary embodiment.

With reference to FIG. 19, an advantageous effect of the communication system 125 according to the present exemplary embodiment will be described. FIG. 19 is a sequence diagram illustrating one example of a flow of processing in the communication system 125 according to the fifth exemplary embodiment.

The communication system 125 calculates a timing of transmitting trigger information on the basis of a timing of transmitting information and the like and transmits trigger information at the calculated timing. As a result, since the transmission apparatus 123 continues to manage managed communication resources, upon transmitting the information, it is unnecessary to newly allocate communication resources. Therefore, according to the communication system 125 of the present exemplary embodiment, a communication delay can be reliably reduced.

While in the above-described example, it was described that a probe packet was transmitted to the reception apparatus 124, a transmission destination to which the probe packet is transmitted need not be the reception apparatus 124 but may be another apparatus configured via the communication network 104.

For the above-described exemplary embodiments, one feasible example will be described.

The transmission apparatus 123 is, for example, a smartphone. The reception apparatus 124 is, for example, a Personal Computer (PC). The communication network 104 is, for example, the Internet. The smartphone can communicate via an LTE network provided by a communication carrier. The PC can communicate with the Internet via a fixed access line.

The probe generation unit 120, the determination unit 110, and the packet generation unit 107 each are, for example, an application program executed in a CPU included in the smartphone. The application program is mounted as middleware in the smartphone. The data input unit 106 and the timing input unit 109 are, for example, an API (Application Programming Interface) in the middleware.

Further, the communication unit 108 can be realized, for example, by combining a socket API provided by an operating system in the smartphone, a communication protocol stack, and an LTE communication device. The probe analysis unit 122 and the estimation unit 121 are, for example, an application program executed by a CPU in the PC. The application program is mounted, for example, as middleware.

The data input unit 115 is a middleware API. The communication unit 112 can be realized by combining an API provided by an operating system in the PC, a communication protocol stack, and an Ethernet (a registered trademark) communication device The exemplary embodiments can be realized as in the example described above. Further, the exemplary embodiments may be realized as in one example to be described later.

The transmission apparatus 123, the reception apparatus 124, and the communication network 104 include the configuration similar to the above-described example.

The probe generation unit 120, the storage unit 111, the determination unit 110, the packet generation unit 107, the probe analysis unit 122, and the estimation unit 121 are, for example, an application program executed by a CPU in a smartphone. The application program is mounted as middleware in the smartphone.

The data input unit 106 and the timing input unit 109 are, for example, an API in the middleware. Further, the communication unit 112 can be realized by combining a socket API, a communication protocol stack provided by an operating system in the smartphone and an LTE communication device. The communication unit 112 can be realized by combining a communication protocol stack provided by an operating system in the PC and an Ethernet communication device. The data output unit 115 is, for example, a socket API provided by the OS in the PC.

The probe packet is, for example, an Echo in ICMP Internet_Control_Message_Protocol). ICMP is a protocol mounted in substantially all devices processing in accordance with IP (Internet_Protocol). In accordance with ICPM, a device that receives an ICMP_Echo_Request immediately transmits an ICMP_Echo_Reply. Therefore, even when function for processing a probe packet is not included, the reception apparatus 124 can estimate a communication path characteristic using an ICMP_Echo.

Further, a base station manages communication resources in LTE. When the base station executes transmission to a terminal (i.e. when the reception apparatus 124 transmits an ICMP_Echo_Reply to the transmission apparatus 123), a communication delay resulting from scheduling hardly occurs. Therefore, according to the present exemplary embodiment, even in ICMP, a communication characteristic can be estimated with high accuracy.

In a communication apparatus that receives an ICMP_Echo_Reply, the probe analysis unit 122 and the estimation unit 121 execute the processing similar to the probe analysis unit 113 and the estimation unit 114 in the above-described example, respectively. Hereinafter, the probe analysis unit 122 and the estimation unit 121 execute the processing shown in the above-described example.

In the above-described example, a probe packet was an ICMP_Echo but is not limited to the above-described example. The probe packet may be, for example, an Echo function (port 7 is used) specified by TCP (Transmissin_Control_Protocol) or UDP (User_Datagram_Protocol).

The reception apparatus 124 may include a function for transmitting a packet in accordance with a packet to be received. In this case, the transmission apparatus 123 may analyze a probe packet and estimate a communication path characteristic. When, for example, a packet transmitted by the reception apparatus 124 includes a timing of reception by the reception apparatus 124, the transmission apparatus 123 may estimate a communication path characteristic on the basis of the reception timing and the like. In this case, when the reception apparatus 124 transmits a packet to the transmission apparatus 123, no communication delay occurs. Therefore, according to the communication system 125 of the present exemplary embodiment, estimation accuracy is further enhanced.

Further, in the above-described example, an example in which the communication network 104 was LTE was described, but the communication network 104 is not limited to the above-described example. The communication network 104 may be, for example, 3G (3rd Generation, the third-generation cellular phone system). Further, the communication network 104 may be WiMAX (Worldwide_Interoperability_for_Microwave_Access), WiFi (Wireless_Fidelity), a wired communication network, or the like.

The communication system 125 according to the fifth exemplary embodiment includes the configuration similar to the fourth exemplary embodiment, and therefore, the fourth exemplary embodiment can have the advantageous effect similar to the fifth exemplary embodiment. In other words, according to the communication system 125 of the fifth exemplary embodiment, a communication delay can be reliably reduced.

The reception apparatus 124 may include a function for transmitting a received probe packet. Many communication apparatuses include, in advance, a function for transmitting a received probe packet, and therefore, it is unnecessary to add the function to the reception apparatus 124. In other words, according to the communication system 125 of the fifth exemplary embodiment, the reception apparatus 124 can be constructed at low cost.

Sixth Exemplary Embodiment

Figure 20:
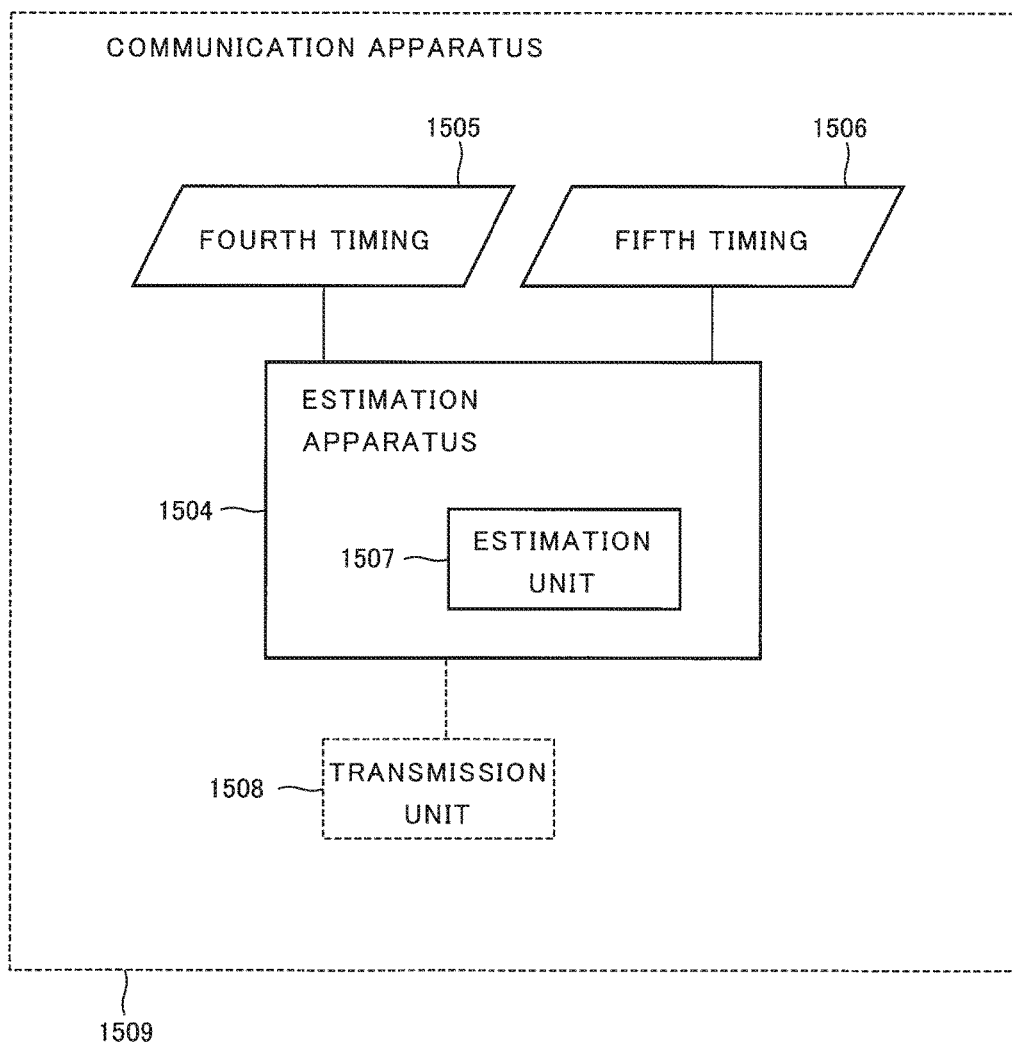
FIG. 20 is a block diagram illustrating the configuration of the estimation apparatus according to the sixth exemplary embodiment of the present invention.

With reference to FIG. 20 and FIG. 7 to FIG. 10, a configuration of an estimation apparatus 1504 according to a sixth exemplary embodiment of the present invention and processing executed by the estimation apparatus 1504 will be described in detail. FIG. 20 is a block diagram illustrating the configuration of the estimation apparatus 1504 according to the sixth exemplary embodiment of the present invention.

The estimation unit 1504 according to the sixth exemplary embodiment includes an estimation unit 1507.

A communication apparatus 1509 includes a transmission unit 1508 and the estimation apparatus 1504.

First, the estimation unit 1507 estimates a resource cycle in which second communication resources are allocated on the basis of a fourth timing 1505 of transmitting a packet and a fifth timing 1506 of receiving a packet responding to the packet (step S2701).

There may be employed a second timing of allocating second communication resources to a request for communication resources that transmit information, a third timing of releasing allocated second communication resources, or a second period in which communication resources or second communication resources continue to be allocated.

Processing for estimating a resource cycle by the estimation unit 1507 will be described.

The estimation unit 1507 calculates a numerical value satisfying a constraint that a variance of residues (remainders) obtained by dividing the fifth timings 1506 by the numerical value is equal to or smaller than a threshold and estimates the calculated value as a resource cycle (step S2701). When there are a plurality of calculated numerical values, the estimation unit 1507 may estimate a maximum numerical value as a resource cycle.

The estimation unit 1507 can, for example, calculate the above-described numerical value by executing the processing described later.

First, the estimation unit 1507 calculates residues obtained by dividing fifth timings 1506 by a numerical value (step S2801). The estimation unit 1507 calculates residues for fifth timings regarding a plurality of packets. The estimation unit 1507 calculates a variance of the residues for the fifth timings (step S2802).

In this case, the estimation unit 1507 may divide the calculated residues into a plurality of sections in accordance with magnitudes of the residues and calculate frequencies in the divided section. When calculating frequencies in a section, the estimation unit 1507 may calculate a variance of the frequencies in the divided section. The estimation unit 1507 may calculate information entropies, for example, on the basis of frequencies in a section as the above-described variance. In other words, processing for calculating a variance by the estimation unit 1507 is not limited to the above-described example.

Hereinafter, a variance or the like calculated in accordance with the above-described processing will be expressed as a "variation."

In the above-described example, the estimation unit 1507 calculated a variation, but may calculate a kurtosis representing a concentration degree of distributions of residues. In this case, with a decrease in kurtosis, a variation increases.

Then, the estimation unit 1507 determines whether the calculated variance is equal to or smaller than a predetermined threshold (step S2803).

The estimation unit 1507 estimates, when determining that the variance is equal to or smaller than the predetermined threshold (YES in step S2803), the numerical value as a resource cycle (step S2804). On the other hand, the estimation unit 1507 changes, when determining that the variance exceeds the predetermined threshold (NO in step S2803), the numerical value and executes processing in step S2801 to step S2804 regarding to the changed numerical value.

In the above-described processing, the estimation unit 1507 may select a numerical value from a predetermined range.

In other words, using the above-described processing, the estimation unit 1507 can calculate a resource cycle.

Further, the estimation unit 1507 calculates periods from fourth timings 1505 to fifth timings 1506 (step S2901). The estimation unit 1507 may estimate a residue obtained by dividing, by a resource cycle, a fourth timing 1505 in which a residue obtained by dividing the calculated period by the resource cycle is smallest (step S2902) as a second timing (step S2903).

A method for calculating a second period will be described. For convenience of description, a period between two adjacent fourth timings 1505 is expressed as a transmission interval.

First, the estimation unit 1507 receives a plurality of fourth timings 1505 in a specific transmission interval (step S3001). The estimation unit 1507 calculates a variance of residues obtained by dividing the fourth timings 1505 received in the specific transmission interval by a resource cycle (step S3002) and determines whether the calculated variance is equal to or greater than a predetermined second threshold (step S3003).

The estimation unit 1507 estimates, when determining that the variance is equal to or greater than the predetermined second threshold (YES in step S3003), the specific transmission interval as a second period (step S3004). The estimation unit 1507 estimates a maximum specific transmission interval as a second period when there are a plurality of specific transmission intervals that satisfy the above-described condition.

The estimation unit 1507 changes, when determining that the variance is smaller than the predetermined second threshold (NO in step S3003), the specific transmission interval and execute processing in step S3001 to step S3004 regarding to the changed transmission interval.

The estimation unit 1507 estimates a second period by the above-described processing.

A base station (not illustrated) allocates second communication resources at a second timing. When an interval of the second timing is constant (a value thereof is expressed as a "resource cycle"), the base station (not illustrated) allocates second communication resources at the second timing and then allocates first communication resources for transmitting information.

On the other hand, the communication apparatus 1509 transmits a first message using the second communication resources and also transmits information using the first communication resources.

When the communication apparatus 1509 transmits information immediately after the first communication resources are allocated at a second timing, a fourth timing 1505 occurs in accordance with the second timing. In this case, a difference between the second timing and the fourth timing 1505 becomes substantially constant, and therefore, the above-described residue becomes substantially constant. In many cases, the communication apparatus 1509 transmits information immediately after first communication resources are allocated at the second timing. As a result, the second timing and the fourth timing 1505 occur at a resource cycle, and therefore, when the fourth timing 1505 is divided by the resource cycle, a residue has a constant value. On the other hand, when the fourth timing 1505 is divided by another value, a resource cycle and the another value are different from each other, and therefore, a residue does not have a constant value.

Therefore, as described above, the estimation unit 1507 can accurately estimate a resource cycle on the basis of a numerical value in which a variance of residues is equal to or smaller than a threshold (e.g. the variance is 0 for a constant value). Further, a fifth timing 1506 occurs at a resource cycle in the manner similar to a fourth timing 1505, and therefore, the estimation unit 1507 can accurately estimate a second timing and a second period using the above-described processing.

In other words, according to the estimation apparatus 1504 of the sixth exemplary embodiment, a state such as a communication delay or the like of a communication network can be estimated with high accuracy.

As illustrated in the above-described exemplary embodiments, the transmission unit 1508 may transmit a timing of transmitting trigger information on the basis of a second timing calculated by the estimation apparatus 1504.

(Hardware Configuration Example)

A configuration example of hardware resources that realize a communication apparatus or an estimation apparatus in the above-described exemplary embodiments of the present invention using a single calculation processing apparatus (an information processing apparatus or a computer) will be described. However, the communication apparatus or the estimation apparatus may be realized using physically or functionally at least two calculation processing apparatuses.

Further, the communication apparatus or the estimation apparatus may be realized as a dedicated apparatus.

Figure 21:
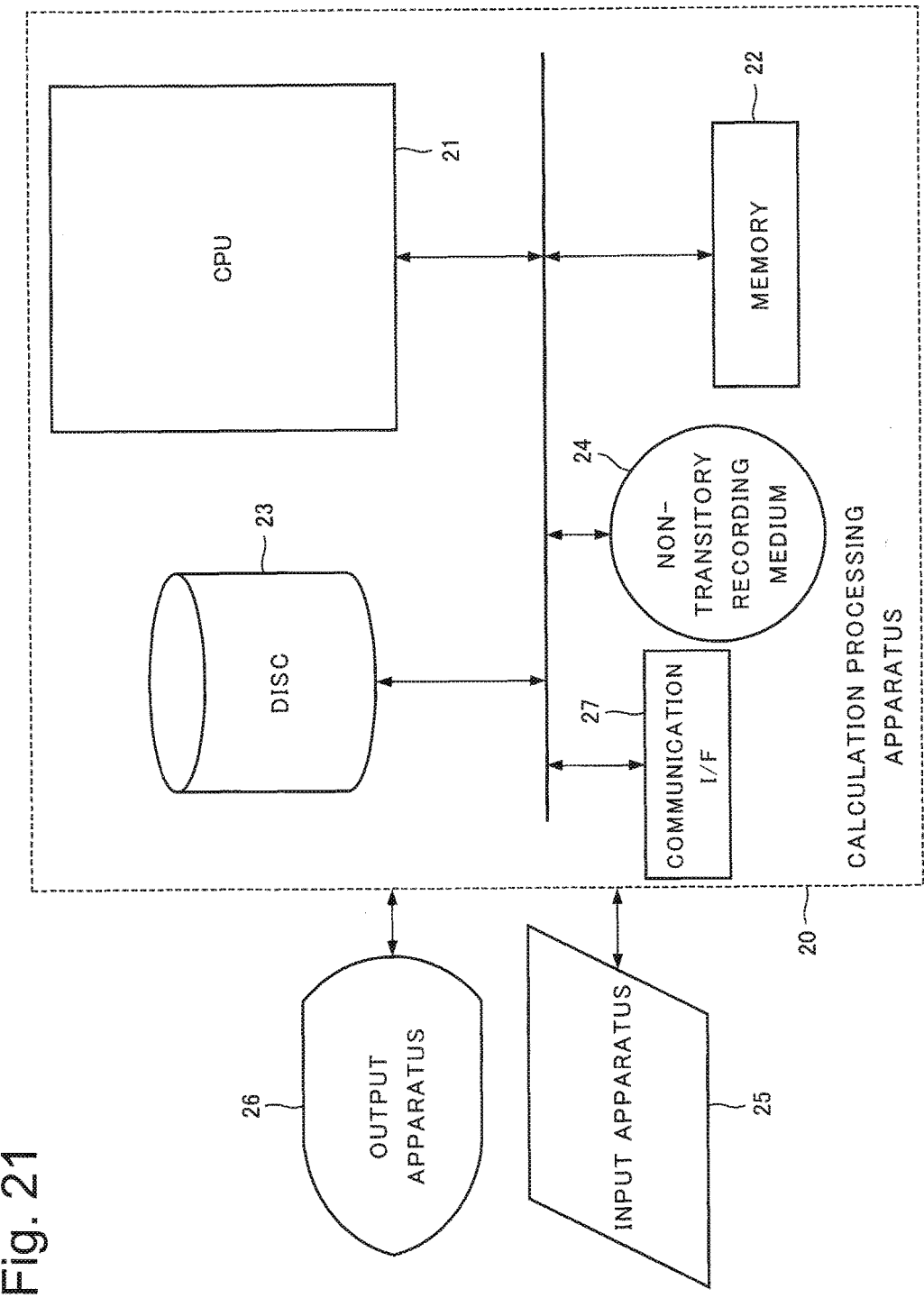
FIG. 21 is a block diagram schematically illustrating a hardware configuration of a calculation processing apparatus capable of realizing the communication apparatus according to each of the first exemplary embodiment to the fifth exemplary embodiment or the estimation apparatus according to the sixth exemplary embodiment.
Figure 22:
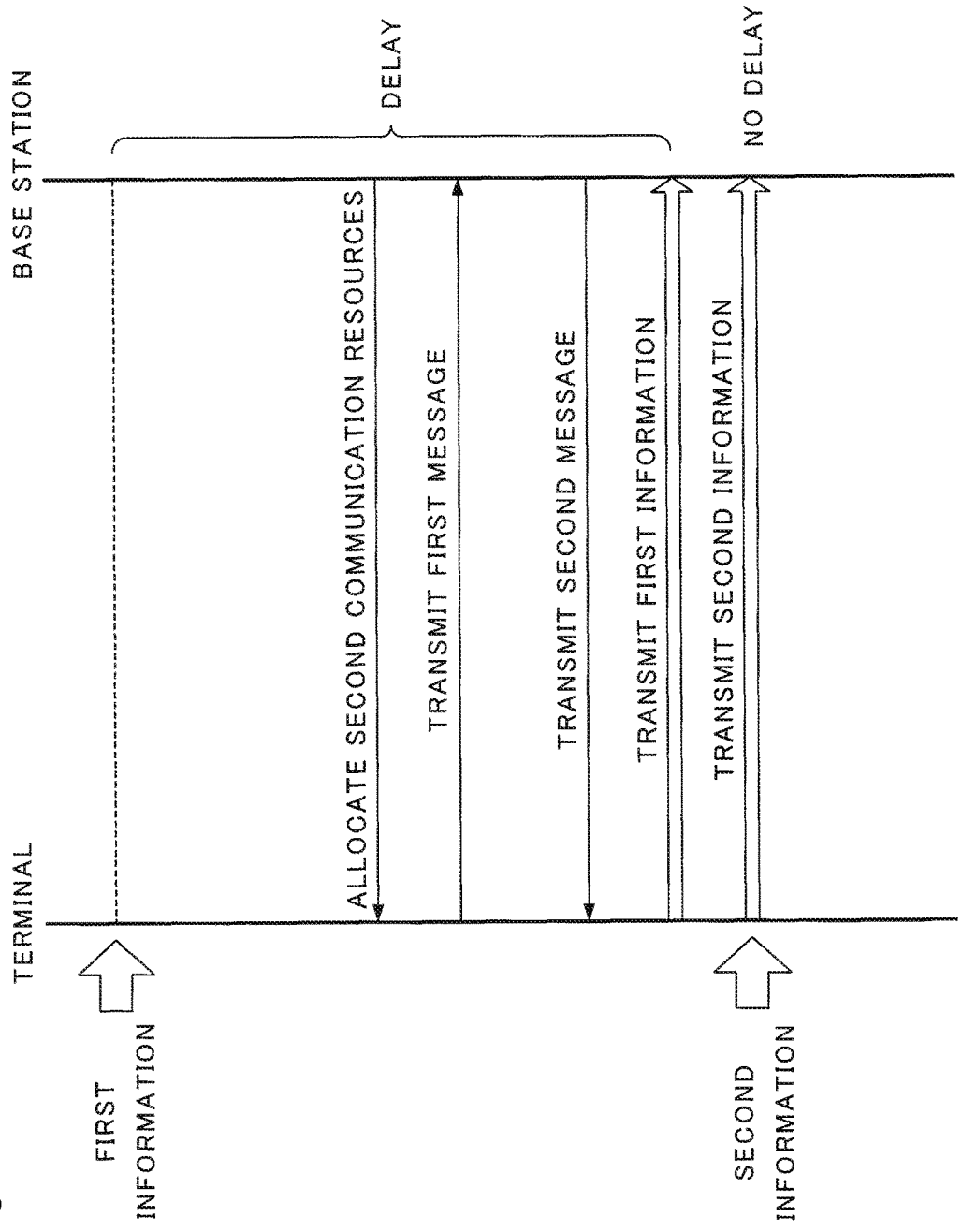
FIG. 22 is a sequence diagram illustrating processing in which information is transmitted from a terminal to a base station.

FIG. 21 is a block diagram schematically illustrating a hardware configuration of a calculation processing apparatus capable of realizing the communication apparatus according to each of the first exemplary embodiment to the fifth exemplary embodiment or the estimation apparatus according to the sixth exemplary embodiment. A calculation processing apparatus 20 includes a CPU 21, a memory 22, a disc 23, a non-transitory recording medium 24, an input apparatus 25, an output apparatus 26, and a communication interface (hereinafter, expressed as a "communication I/F") 27. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital_Versatile_Disc, Blu-ray Disc (a registered trademark), Universal Serial Bus (USB) memory, or Solid State Drive. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes a communication program present on the memory 22 corresponding to a function (processing) indicated by each unit illustrated in FIG. 1, FIG. 3, FIG. 5, FIG. 12, FIG. 17, or FIG. 20 described above or an estimation program (FIG. 2, FIG. 4, FIG. 6 to FIG. 10, FIG. 13, or FIG. 18). The CPU 21 sequentially executes the processing described in each exemplary embodiment of the present invention.

In other words, in such a case, it is conceivable that the present invention can also be made using the communication program or estimation program. Further, it is conceivable that the present invention can also be made using a computer-readable, non-transitory recording medium storing the communication program or estimation program.

The present invention has been described using the above-described exemplary embodiments as exemplary cases. However, the present invention is not limited to the above-described exemplary embodiments. In other words, the present invention is applicable with various aspects that can be understood by those skilled in the art without departing from the scope of the present invention.

This application is based upon and claims the benefit of priority from Japanese patent application No. 2013-268572, filed on Dec. 26, 2013, the disclosure of which is incorporated herein in its entirety.

REFERENCE SIGNS LIST

1101 Communication apparatus
1102 Transmission unit
1103 Communication network
1104 Second communication apparatus
1105 Base station
1301 Communication apparatus
1302 Transmission unit
1501 Communication apparatus
1502 Estimation unit
1503 Transmission unit
1504 Estimation apparatus
1505 Fourth timing
1506 Fifth timing
1507 Estimation unit
1508 Transmission unit
1509 Communication apparatus
101 Communication system
102 Transmission apparatus
103 Reception apparatus
104 Communication network
105 Probe generation unit
106 Data input unit
107 Packet generation unit
108 Communication unit
109 Timing input unit
110 Determination unit
111 Storage unit
112 Communication unit
113 Probe analysis unit
114 Estimation unit
115 Data output unit
120 Probe generation unit
121 Estimation unit
122 Probe analysis unit
123 Transmission apparatus
124 Reception apparatus
125 Communication system
20 Calculation processing apparatus
21 CPU
22 Memory
23 Disc
24 Non-transitory recording medium
25 Input apparatus
26 Output apparatus
27 Communication I/F

What is claimed is:

1. A communication apparatus comprising:
   determining a timing for transmitting trigger information via a communication network on basis of a time length of a second period in which communication resources are allocated by a base station,
   transmitting the trigger information at the determined timing via the communication network in accordance with allocation of communication resources during a first period, the first period being a period from a first timing of transmitting the information via the communication network to a second timing and;
   transmitting information via allocated communication resources.

2. The communication apparatus according to claim 1, wherein
   the communication apparatus transmits the trigger information in a second period.

3. The communication apparatus according to claim 2, wherein
   the communication apparatus transmits the trigger information in the second periods when the first period includes a plurality of the second periods.

4. The communication apparatus according to claim 1, wherein the communication apparatus transmits the trigger information before the first timing and after a second timing closest to the first timing.

5. The communication apparatus according to claim 3, wherein the communication apparatus transmits the trigger information every time a period shorter than a shortest second period of the plurality of second periods elapses.

6. The communication apparatus according to claim 1, further comprising:
   an estimation unit configured to estimate the second timing on a basis of a fourth timing of transmitting a packet and a fifth timing of receiving a packet responding to the packet, wherein
   the communication apparatus transmits the trigger information on a basis of the second timing estimated by the estimation means.

7. A communication method comprising: by an information processing apparatus,
   determining a timing for transmitting trigger information via a communication network on basis of a time length of a second period in which communication resources are allocated by a base station,
   transmitting the trigger information at the determined timing via the communication network in accordance with allocation of communication resources during a first period, the first period being a period from a first timing of transmitting the information via the communication network to a second timing and;
   transmitting information via allocated communication resources.

8. A non-transitory recording medium storing a communication program that causes a computer to realize:
   a transmission function configured to determine a timing for transmitting trigger information via a communication network on basis of a time length of a second period in which communication resources are allocated by a base station,
   transmit the trigger information at the determined timing via the communication network in accordance with allocation of communication resources during a first period, the first period being a period from a first timing of transmitting the information via the communication network to a second timing and;
   transmitting information via allocated communication resources.

9. The non-transitory recording medium according to claim 8, wherein
   the transmission function included in the communication program transmits the trigger information in a second period.

10. The non-transitory recording medium according to claim 9, wherein
    when the first period includes a plurality of the second periods, the transmission function included in the communication program transmits the trigger information in each of the second periods.

* * * * *